US012297680B2

(12) United States Patent
Eskilsson

(10) Patent No.: US 12,297,680 B2
(45) Date of Patent: May 13, 2025

(54) SLIDING CLOSET DOOR ASSEMBLY AND METHOD OF ASSEMBLING A SLIDING CLOSET DOOR

(71) Applicant: Inter IKEA Systems B.V., Ln Delft (NL)

(72) Inventor: Tomas Eskilsson, Hamneda (SE)

(73) Assignee: Inter IKEA Systems B.V., Ln Delft (NL)

( * ) Notice: Subject to any disclaimer, the term of this patent is extended or adjusted under 35 U.S.C. 154(b) by 123 days.

(21) Appl. No.: 17/921,764

(22) PCT Filed: May 4, 2021

(86) PCT No.: PCT/SE2021/050412
§ 371 (c)(1),
(2) Date: Oct. 27, 2022

(87) PCT Pub. No.: WO2021/225501
PCT Pub. Date: Nov. 11, 2021

(65) Prior Publication Data

US 2023/0160247 A1 May 25, 2023

(30) Foreign Application Priority Data

May 4, 2020 (SE) .................................... 2050505-3

(51) Int. Cl.
*E06B 3/00* (2006.01)
*E05D 15/06* (2006.01)
(Continued)

(52) U.S. Cl.
CPC .......... *E05D 15/063* (2013.01); *E06B 3/4663* (2013.01); *E06B 3/70* (2013.01);
(Continued)

(58) Field of Classification Search
CPC ................. E05D 15/063; E06B 3/4663; E06B 2003/7011
See application file for complete search history.

(56) References Cited

U.S. PATENT DOCUMENTS 3,460,290 A * 8/1969 Wutzke ................. E06B 3/4609 49/411
2003/0205015 A1 11/2003 Birmingham et al.
2014/0353982 A1 12/2014 Wei

FOREIGN PATENT DOCUMENTS

CN 210217503 U 3/2020
DE 29900720 U1 4/1999
(Continued)

OTHER PUBLICATIONS

English translation of GB document (Year: 1992).*
(Continued)

*Primary Examiner* — Daniel J Troy
*Assistant Examiner* — Daniel Alvarez
(74) *Attorney, Agent, or Firm* — Merchant & Gould P.C.

(57) ABSTRACT

A sliding closet door assembly comprises a first door panel (22*a*); and a door frame assembly comprising at least a first side edge strip arrangement, a second side edge strip arrangement, a top edge strip arrangement, and a bottom edge strip arrangement configured to define a door frame (20) extending in a door frame plane, the door frame (20) being adapted to receive and hold said first door panel (22*a*), wherein the door frame (20) is configured to receive said first door panel (22*a*) in a door panel insertion direction (T) transversal to the door frame plane.

20 Claims, 18 Drawing Sheets

(51) Int. Cl.
*E06B 3/46* (2006.01)
*E06B 3/70* (2006.01)

(52) U.S. Cl.
CPC ..... *E05Y 2201/47* (2013.01); *E05Y 2600/528* (2013.01); *E05Y 2600/53* (2013.01); *E05Y 2900/20* (2013.01); *E06B 2003/7011* (2013.01)

(56) References Cited

FOREIGN PATENT DOCUMENTS

| | | | | | |
|---|---|---|---|---|---|
| ES | 2156494 | A1 | | 6/2001 | |
| GB | 2252999 | A | * | 8/1992 | ............... E06B 3/74 |
| KR | 101558129 | B1 | | 10/2015 | |
| KR | 20180107678 | A | | 10/2018 | |
| WO | 2018/206885 | A1 | | 11/2018 | |
| WO | 2018/232439 | A1 | | 12/2018 | |

OTHER PUBLICATIONS

PCT International Search Report for PCT Application No. PCT/SE2021/050412 mailed Jun. 29, 2021 (4 pages).

PCT Written Opinion for PCT Application No. PCT/SE2021/050412 mailed Jun. 29, 2021 (5 pages).

* cited by examiner

SLIDING CLOSET DOOR ASSEMBLY AND METHOD OF ASSEMBLING A SLIDING CLOSET DOOR

This application is a National Stage Application of PCT/SE2021/050412, filed 4 May 2021, which claims benefit of Serial No. 2050505-3, filed 4 May 2020 in Sweden, and which applications are hereby incorporated by reference in their entireties. To the extent appropriate, a claim of priority is made to each of the above disclosed applications.

FIELD OF THE INVENTION

The present invention relates to a sliding closet door assembly and to a method of assembling a sliding closet door.

BACKGROUND

WO2018206885A1 suggests a sliding closet door comprising a plurality of panels arranged within a door frame.

There is however a need for a sliding closet door which is easier to install.

SUMMARY

It is an object of the present invention to solve, or at least mitigate, parts or all of the above mentioned problems. To this end, there is provided a sliding closet door assembly comprising a first door panel; and a door frame assembly comprising at least a first side edge strip arrangement, a second side edge strip arrangement, a top edge strip arrangement and a bottom edge strip arrangement. The first side edge strip arrangement, second side edge strip arrangement, top edge strip arrangement, and bottom edge strip arrangement are configured to define a door frame extending in a door frame plane, wherein the door frame is adapted to receive and hold said first door panel. The door frame is configured to receive said first door panel in a door panel insertion direction transversal to the door frame plane, i.e. along a direction crossing the door frame plane. Thereby, said first door panel may be mounted within the door frame after the door frame has been raised to a vertical posture, and optionally been connected to or suspended in a door guide rail. This reduces the effort of mounting the door to the door rail, since the weight of said first door panel does not add to the weight of the door frame when mounting the door frame in the door guide rail. The sliding closet door assembly defined above also allows making any fine-tuning of the door position, e.g. by adjusting the position(s) of any riders configured to ride in the door guide rail, or the position of the door guide rail itself, prior to mounting said first door panel, which even further facilitates installation. According to embodiments, the door frame may be configured to enable inserting said first door panel, when oriented parallel to the door frame plane, in a door panel insertion direction perpendicular to the door frame plane. Typically, the door frame as well as said first door panel may have a substantially rectangular shape, even though other shapes are also possible.

According to embodiments, at least one of the first side edge strip arrangement, second side edge strip arrangement, top edge strip arrangement, and a bottom edge strip arrangement may comprise an attachment arrangement configured to attach said first door panel to the door frame. The attachment arrangement may configured to releasably attach said first door panel to the door frame, such that the door panel may easily be replaced.

According to embodiments, said first door panel may be lockable to the door frame via a snap-lock.

According to embodiments, at least one of said first side edge strip arrangement, second side edge strip arrangement, top edge strip arrangement, and bottom edge strip arrangement may comprise a respective support strip configured to be rigidly connected to adjacent strip arrangements of said first side edge strip arrangement, second side edge strip arrangement, top edge strip arrangement, and bottom edge strip arrangement, and a respective lock strip movable in relation to said support strip between an open position, in which the lock strip allows free passage of a respective door panel edge, of said first door panel, into the door frame, and a lock position, in which the lock strip locks said respective edge of said first door panel within the door frame. The lock strip may be configured to remain attached to the support strip in each of the open and lock positions.

According to embodiments, said respective lock strip may be pivotally connected to the respective support strip, to pivot about a respective pivot axis parallel to the respective support strip, between said open position and said lock position.

According to embodiments, said at least one of said first side edge strip arrangement, second side edge strip arrangement, top edge strip arrangement, and bottom edge strip arrangement may further comprise a compressible sealing strip configured to be squeezed between said first door panel and at least one of said respective support strip and said respective lock strip. The sealing strip may thereby take up any play between said first door panel and the at least one of said respective support strip and said respective lock strip, which eases manufacturing tolerances. According to embodiments, the sealing strip may be configured as a bulb strip. Such a strip may provide substantially the same pressure against the door panel over a large range of door panel thicknesses. Rubber is an exemplary suitable material for the sealing strip.

According to embodiments, at least one of said respective support strip and said respective lock strip may be configured as an extruded profile. By way of example, said respective support strip, said respective lock strip, or both, may be configured as a respective profile of extruded aluminium or plastic. The extruded profile(s) may engage to define a hinge enabling pivoting the lock strip relative to the support strip.

According to embodiments, the lock strip may be lockable in the locking position by an interlocking engagement between a support strip locking portion and a mating lock strip locking portion. The interlocking engagement may form a snap-lock as defined hereinabove. Such a snap-lock may comprise a locking portion of the lock strip configured to slidingly pass over a locking cam of the support strip.

According to embodiments, a shape of said extruded profile of said at least one of said respective support strip and said respective lock strip may define said at least one of said support strip locking portion and said lock strip locking portion. Thereby, no subsequent machining of said at least one of said respective support strip and said respective lock strip is required to form the respective locking portion. According to embodiments, both the respective support strip and the respective lock strip may be configured as an extruded profile, respective shapes of their respective extruded profiles defining their respective locking portions.

According to embodiments, said respective lock strip may be configured to cover, when in said lock position, an outside face of said respective door panel edge.

According to embodiments, at least one of said first side edge strip arrangement, second side edge strip arrangement, top edge strip arrangement, and bottom edge strip arrangement may be configured as a lock strip-less strip arrangement. Clearly, none of the strip arrangements needs a respective lock strip. The sliding closet door assembly may comprise other means of attaching said first door panel to the door frame, such as clips or the like. Moreover, said first door panel does not need to be attached to the door frame at all edges. By way of example, the door panel may be attached at two edges, or at two opposite corners.

According to embodiments, one of said first side edge strip arrangement, second side edge strip arrangement, top edge strip arrangement, and bottom edge strip arrangement may be configured as a fixed-groove strip arrangement comprising a fixed groove configured to receive a respective door panel edge in an edge insertion direction along the door frame plane. Such a strip arrangement may constrain the respective panel edge within the door frame plane without the need for a movable lock strip or other attachment means. Thereby, a lower manufacturing cost and/or a higher strength of the sliding door may be obtained. In particular, the bottom edge strip arrangement may be configured as a fixed-groove strip arrangement, such that the weight of said first door panel may be carried by the fixed-groove strip arrangement.

According to embodiments, said door frame may be configured to, after having received said first door panel, vertically support said first door panel prior to locking the door panel to the door frame.

According to embodiments, the sliding closet door assembly may be configured to define an inside face facing an interior of a closet, and an opposite outside face facing an exterior space, wherein the door frame is configured to receive said first door panel in a door panel insertion direction from the exterior space.

According to embodiments, the sliding closet door assembly may further comprise a second door panel; and a divider strip configured to divide the door frame into a first subframe and a second subframe, the first subframe configured to hold said first door panel and the second subframe configured to hold said second door panel. The first and second door panels may have the same or different panel thicknesses.

According to embodiments, the divider strip may be configured to straddle an edge of at least one of the first and second door panels. Thereby, the divider strip may engage both an inner and an outer face of the respective door panel(s), and prevent the door panel(s) from moving in a direction perpendicular to the door frame plane. Clearly, the divider strip may straddle both the first and second door panels.

According to embodiments, the divider strip may be configured to be positioned on top of said first door panel, and the second door panel is configured to be positioned on top of the divider strip.

According to embodiments, the divider strip may be configured to be attached to at least one of said first and second side edge strip arrangements. Such an arrangement may increase the stability and rigidity of the sliding door. According to embodiments, the divider strip may be configured to be attached to the first side edge strip arrangement as well as the second side edge strip arrangement, which may even further increase the stability of the door.

According to embodiments, the divider strip may be configured to be attached to said at least one of said first and second side edge strip arrangements via a clamping arrangement. Such an arrangement may provide a simple means of attaching the divider strip. Moreover, a clamping arrangement may be configured to be operated by moving a clamping actuator along the door frame plane, to press a clamp of the clamping arrangement in a clamping direction perpendicular to the door frame plane, such that no clamping parts need to be visible from outside the closet. The clamping arrangement may be arranged on a longitudinal end of the divider strip. Still further, if the divider strip is configured to clamp to a portion of at least one of said first and second side edge strip arrangements which has a uniform profile along the length of the at least one of said first and second side edge strip arrangements, the clamping arrangement may be clamped to the at least one of said first and second side edge strip arrangements at an arbitrary and steplessly selectable height.

According to embodiments, the clamping arrangement may comprise a first expanding arrangement configured to ride in a groove along the length of said first side edge strip arrangement, the expanding arrangement being configured to be expanded to clamp against inner faces of the groove. Clearly, the clamping arrangement may also comprise a second expanding arrangement riding in a groove along the length of said second side edge strip arrangement. The expanding arrangement(s) may be configured to be expanded by inserting a plug in an plug insertion direction along the door frame plane. Thereby, the plug may be less visible from the outside of the closet.

According to embodiments, the clamping arrangement may be provided with barbs which, when clamped, lock the divider strip to the at least one of said first and second side edge strip arrangements. Clearly, the clamping arrangement may be provided with barbs at both longitudinal ends of the divider strips for locking, when clamped, the divider strip to each of said first and second side edge strip arrangements.

According to embodiments, two longitudinal ends of the divider strip may be configured to, when mounted in the door frame, be inserted in respective grooves extending along the respective first and second side edge strip arrangements.

According to embodiments, said first door panel may be tool-less attachable to the door frame. For example, any lock strip or clamping arrangement may be configured to be operated without any tools.

According to embodiments, the sliding closet door assembly may further comprise a rider arrangement configured to ride in, and be guided by, a door guide rail extending along the door frame plane. The rider arrangement may comprise one or more top riders configured to ride in a top guide rail adjacent to the top edge strip arrangement of the door, and/or one or more bottom riders configured to ride in a bottom guide rail adjacent to the bottom edge strip arrangement of the door. The rider(s) may be wheels configured to roll in the door guide. Alternatively or additionally, the sliding closet door assembly may comprise other further components, such as door handles, a door guide rail, attachment brackets for attaching the door guide rail to a closet, etc.

According to a second aspect, parts or all of the above mentioned problems are solved, or at least mitigated, by a method of assembling a sliding closet door, the method comprising providing a door frame extending in a door frame plane; connecting the door frame to a door guide rail configured to enable sliding the door frame along a vertical plane coinciding with the door frame plane; and, after connecting the door frame to the door guide rail, mounting a first door panel in the door frame. Connecting the door frame to a door guide rail may comprise suspending the door frame in at least one of a top guide rail configured to guide a top edge of the door, and a bottom guide rail configured to guide a bottom edge of the door. The weight of the door may be carried by either or both of a top guide rail and a bottom guide rail.

According to embodiments, the method may further comprise, after having connected the door frame to the door guide rail and prior to mounting said first door panel in the door frame, operating an adjustment arrangement to adjust the position of the door frame in relation to the door guide rail.

According to embodiments, mounting said first door panel in the door frame may comprise inserting the at least one door panel into the door frame in an insertion direction transversal to the door frame plane.

According to embodiments, the method may further comprise mounting a first divider strip to the door frame, the first divider strip dividing the door frame into a first subframe and a second subframe, the first subframe holding said first door panel; and mounting a second door panel in said second subframe.

It is noted that embodiments of the invention may be embodied by all possible combinations of features recited in the claims. Further, it will be appreciated that the various embodiments described for the sliding closet door assembly are all combinable with the various embodiments of the method as defined in accordance with the second aspect, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
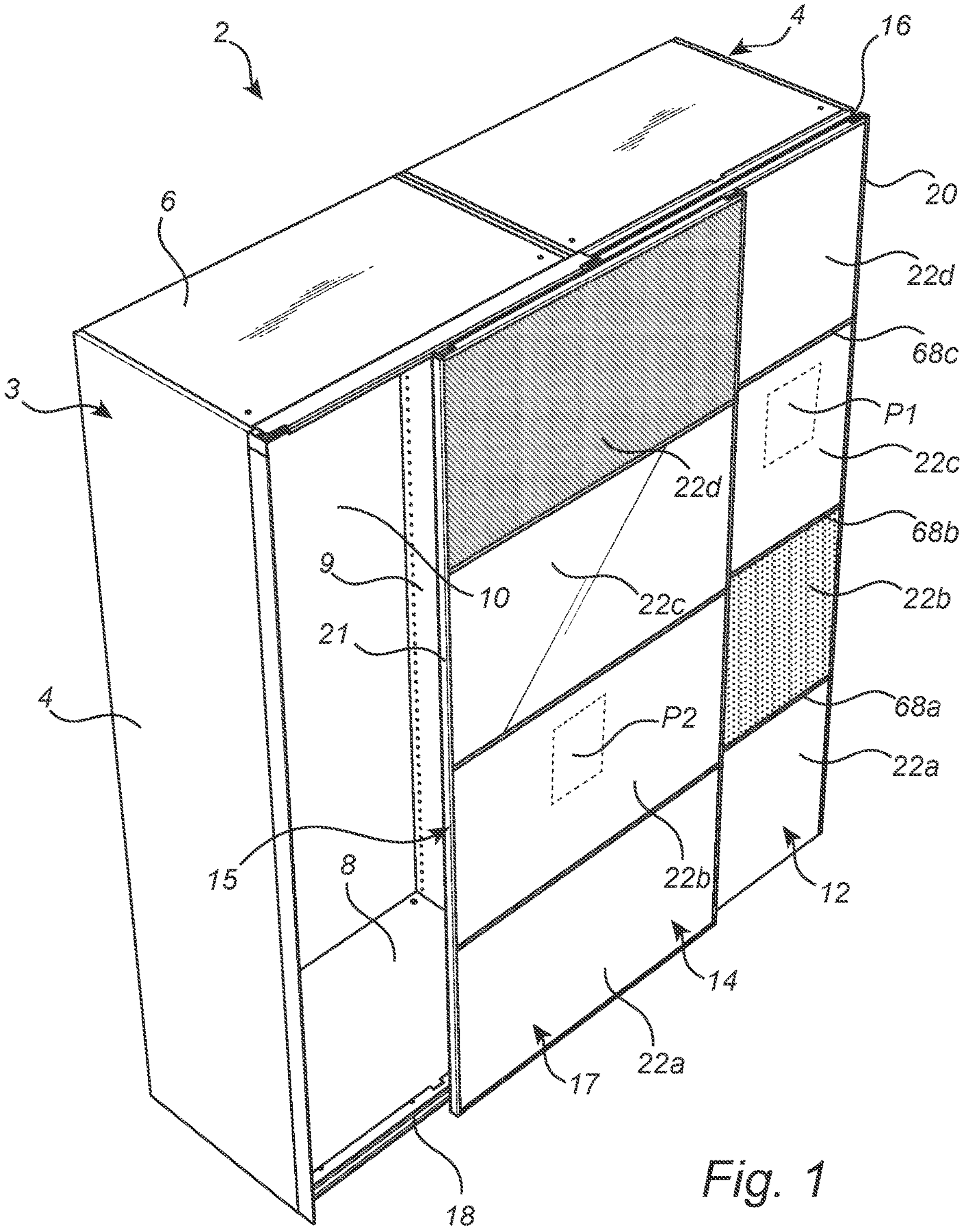
FIG. 1 is a view in perspective of a closet with sliding doors.

FIG. 1 illustrates a closet 2 comprising a closet frame 3 defined by a pair of parallel outer side walls 4, a top wall 6, a floor 8, a divider wall 9 parallel to the side walls 4, and a back wall 10. The top wall 6 is formed by a pair of adjacent, coplanar top panels, and the floor 8 is formed by a pair of adjacent, coplanar floor panels, wherein only one of each is visible in the view of FIG. 1. The closet 2 further comprises a first sliding door 12 and a second sliding door 14, which are movable relative to the closet frame 3, one outside the other. The first sliding door 12 is guidedly suspended in a top guide rail 16 attached to the closet frame 3 to enable movement along a first door plane P1 of the first sliding door 12. The first sliding door 12 is also guided in a bottom guide rail 18, which is attached to the closet frame 3. Likewise, the second sliding door 14 is guidedly suspended in the top guide rail 16, and is guided in the bottom guide rail 18, to enable movement along a second door plane P2 of the second sliding door 14. The second door plane P2 is parallel to the first door plane P1, but the planes P1, P2 do not coincide, such that the first and second doors 12, 14 can freely pass each other.

The first sliding door 12 comprises a first door frame 20 and a plurality of door panels, the plurality of door panels comprising a first door panel 22*a*, a second door panel 22*b*, a third door panel 22*c*, and a fourth door panel 22*d*. As illustrated, the door panels 22*a-d* may be different from each other. By way of example, they may be painted in different colours, and/or be made of different materials, such as wood, glass, plastic, etc. They may also have mutually different thicknesses. A typical exemplary thickness of the door panels 22*a-d* may be between 2 mm and 4 mm. Similar to the first sliding door 12, the second sliding door 14 comprises a second door frame 21 corresponding to the first door frame 20 of the first door 12, and a plurality of door panels 22*a-d*. The door planes P1, P2 also define the planes of the respective door frames 20, 21, and will in the following instead be referred to as door frame planes. Each door 12, 14 has a respective inside face 15 facing the interior of the closet, and an opposite outside face 17 facing an exterior space.

Figure 2:
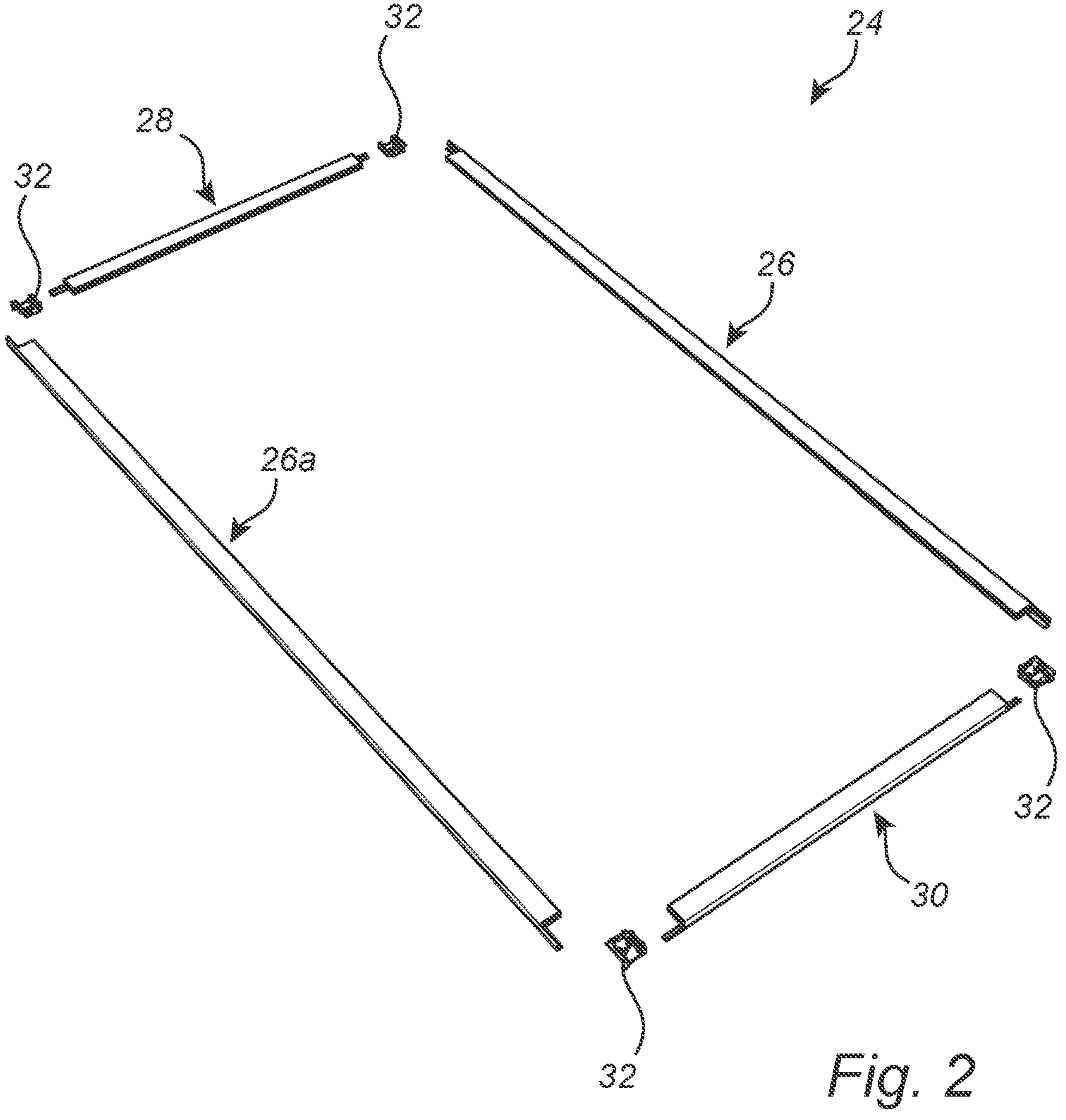
FIG. 2 is a view in perspective of parts of a sliding door assembly for assembling a door frame of a sliding door of the closet of FIG. 1.

FIG. 2 illustrates a door frame assembly 24 for assembling the first door frame 20 of the sliding closet door 12 of FIG. 1. The door frame assembly 24 comprises a first side edge strip arrangement 26*a*, a second side edge strip arrangement 26*b*, a top edge strip arrangement 28 and a bottom edge strip arrangement 30 configured to define the first door frame 20 (FIG. 1). The door frame assembly further comprises four frame joint members 32 for joining the strip arrangements 26*a*, 26*b*, 28, 30.

Figure 3:
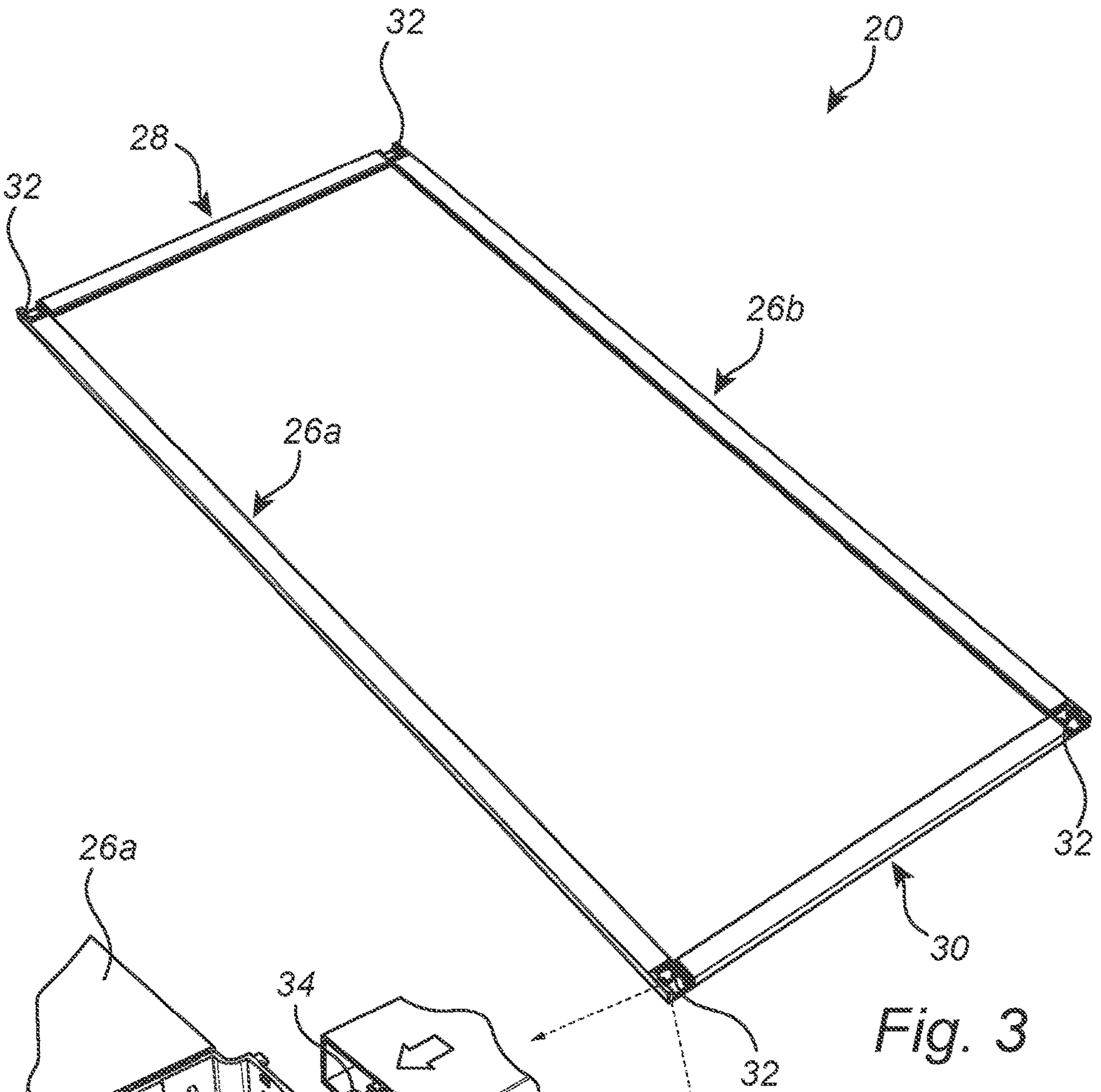
FIG. 3 is a perspective view of the sliding door assembly of FIG. 2 in an intermediate state of assembly, in which the door frame has been assembled.
Figure 3A:
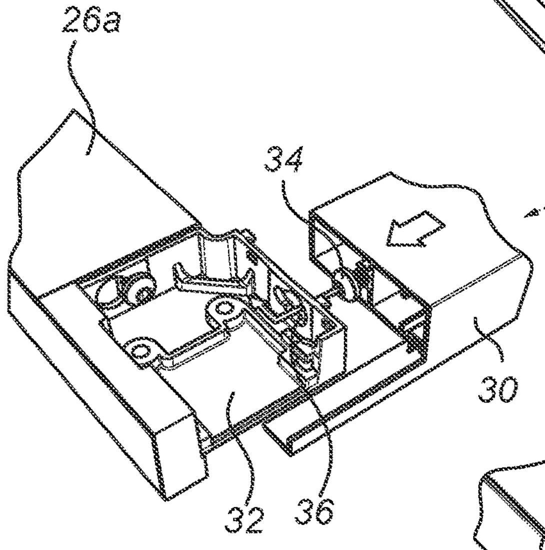
FIG. 3A is a magnified view of a portion of the sliding door assembly of FIG. 3, illustrating the connection of a top edge strip arrangement of the sliding door assembly to a first side edge strip arrangement of the sliding door assembly.
Figure 3B:
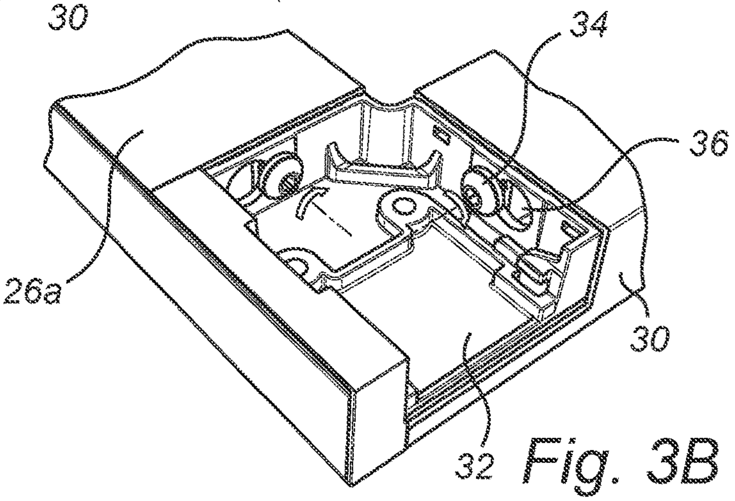
FIG. 3B is a magnified view corresponding to the view of FIG. 3A, after having connected the top edge strip arrangement to the first side edge strip arrangement.

FIG. 3 illustrates how the strip arrangements 26*a*, 26*b*, 28, 30 are joined using the frame joint members 32; in particular, FIGS. 3A and 3B illustrate the joining of the first side edge strip arrangement 26*a* with the bottom edge strip arrangement 30 using a frame joint member 32. Each of the strip arrangements 26*a*, 30 has a respective pre-mounted screw 34, which is inserted in a keyhole slot 36 of the frame joint member 32, and tightened.

Figure 4A:
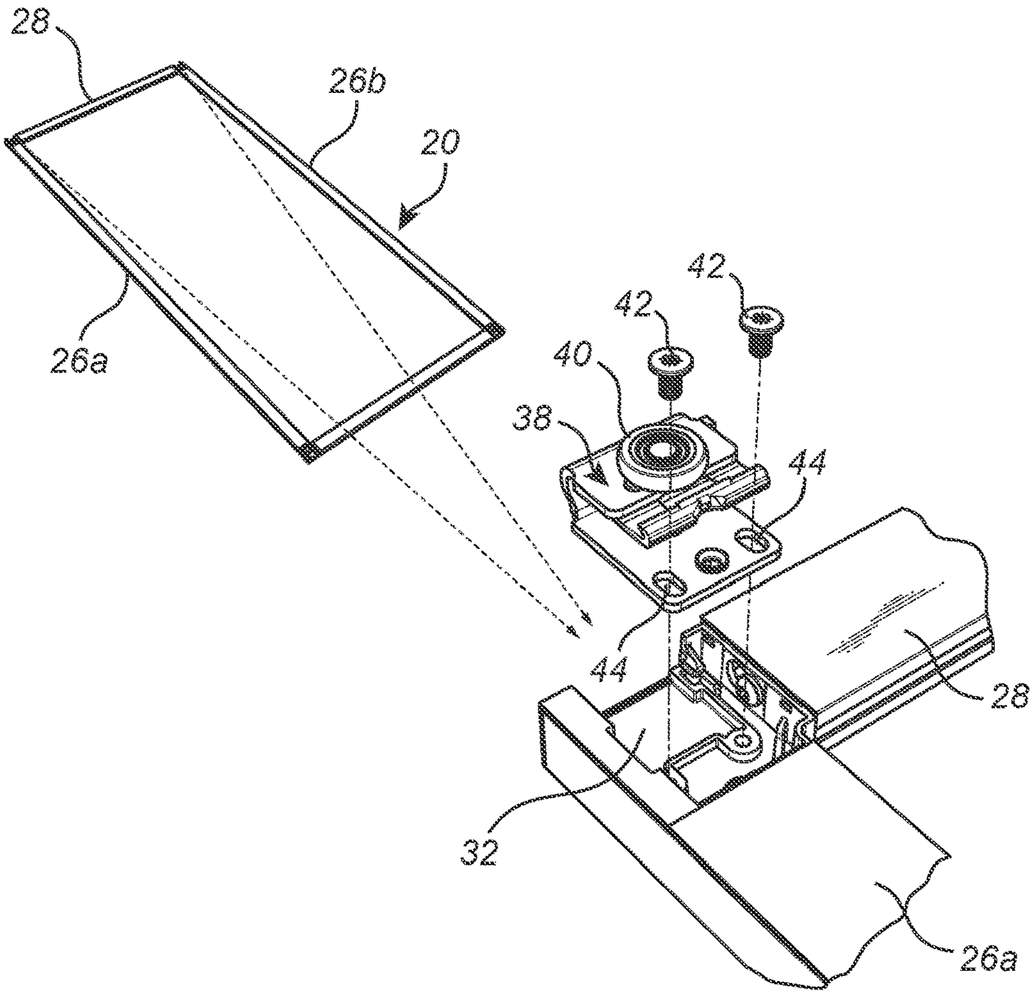
FIG. 4A is a magnified view of a portion of the sliding door assembly of FIG. 3, illustrating the attachment of a top rider to the door frame.
Figure 4B:
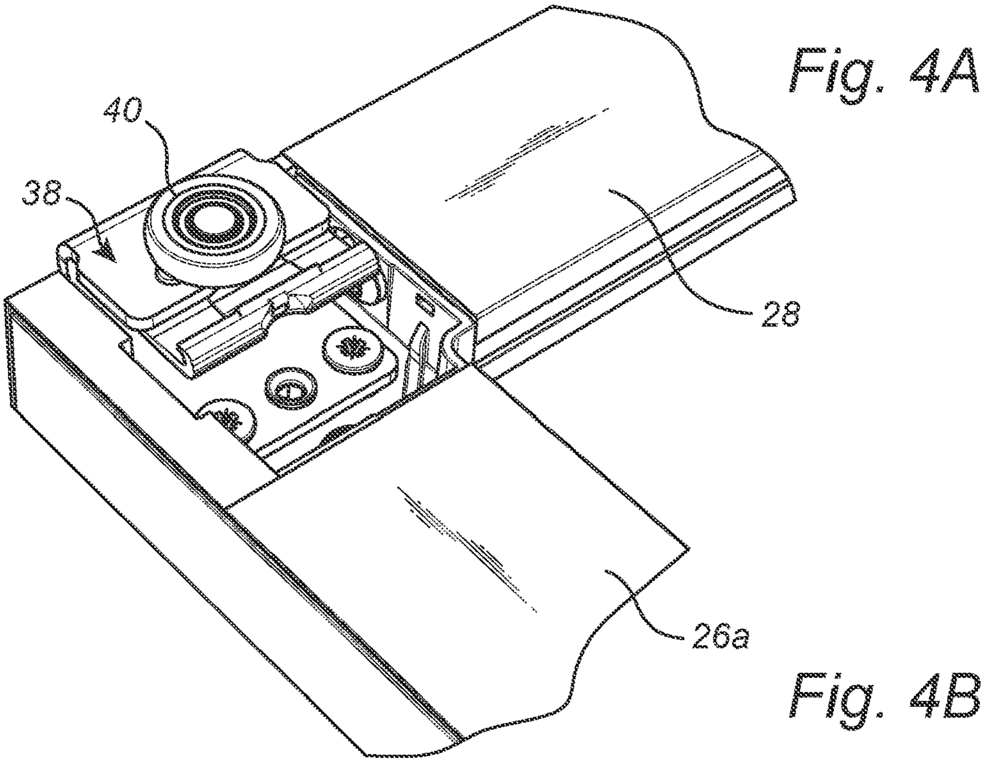
FIG. 4B is a magnified view corresponding to the view of FIG. 4A, after having attached the top rider to the door frame.

FIGS. 4A and 4B illustrate the attachment of a first top rider 38 at the interface between the top edge strip arrangement 28 and the first side edge strip arrangement 26*a*. The top rider 38 comprises a guide wheel 40 configured to ride along a first guide track (not illustrated) in the top guide rail 16 (FIG. 1). The top rider 38 is attached to the first door frame 20 by means of screws 42 through elongate attachment and adjustment holes 44 of the top rider 38. A second, identical top rider (not illustrated) is attached at the interface between the top edge strip arrangement 28 and the second side edge strip arrangement 26*b*.

Figure 5:
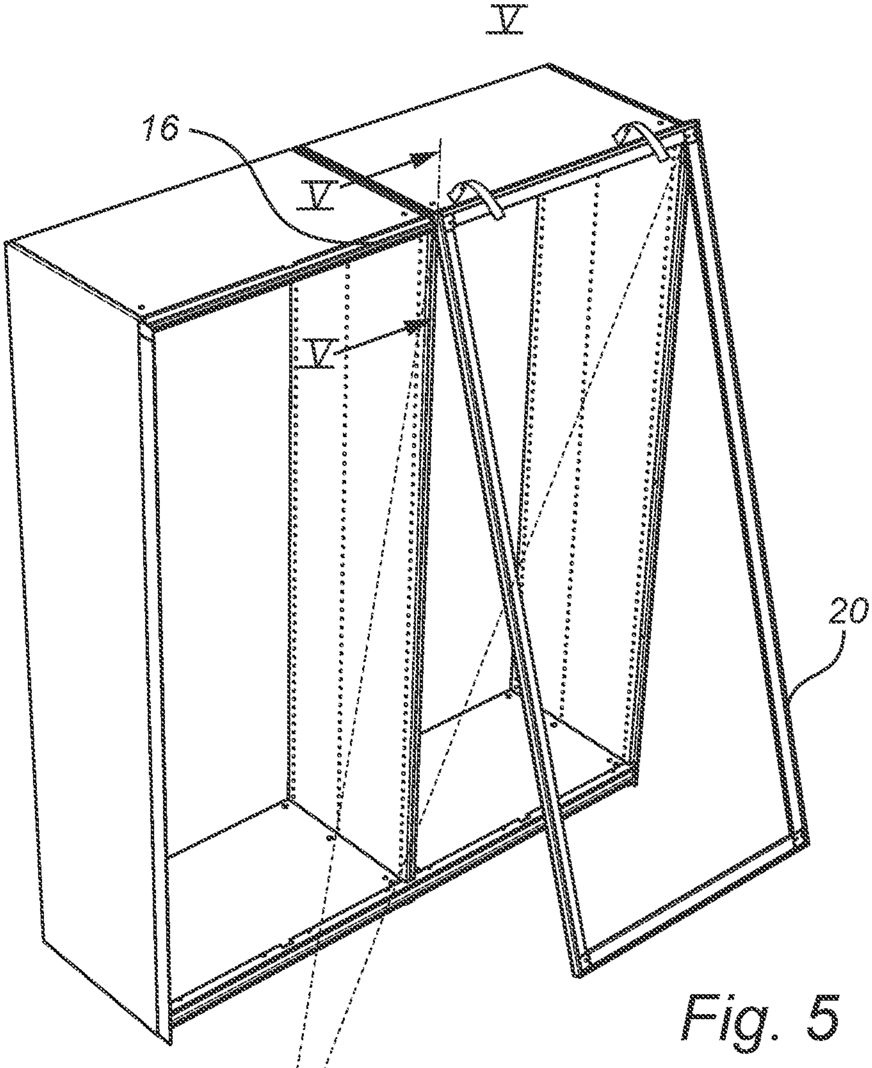
FIG. 5 is a perspective view of the closet of FIG. 1, illustrating the suspension of the door frame of FIGS. 3-4B to the closet by engaging the top riders of FIGS. 4A-B with a top guide rail of the closet.
Figure 5A:
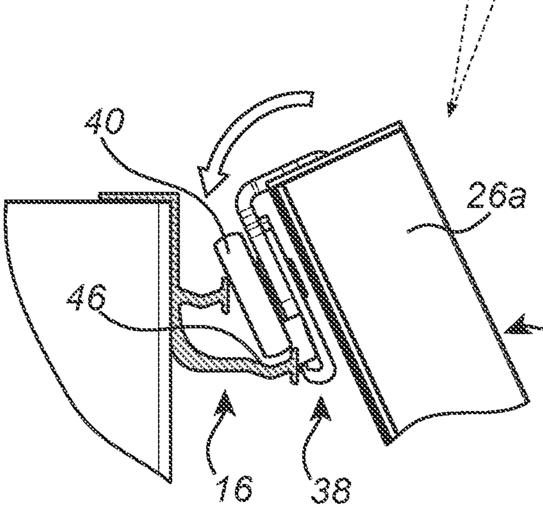
FIG. 5A. illustrates a section of a portion of the view of FIG. 5, the section taken along the vertical plane indicated by the line V-V of FIG. 5.
Figure 5B:
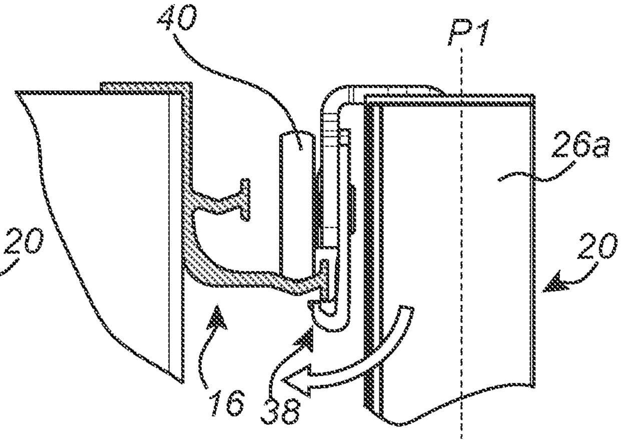
FIG. 5B is a section corresponding to the view of FIG. 5A, and illustrates the closet of FIG. 5 after having engaged the top riders with the top guide rail.

FIG. 5, along with the detail views of FIGS. 5A and 5B, illustrate how the first door frame 20 is hooked onto the top guide rail 16 by positioning the guide wheels 40 in a first, outer guide track 46 of the top guide rail 16, and pivoting the first door frame 20 about a horizontal pivot axis defined by the line of engagement between the guide wheels 40 and the top guide rail 16. After having suspended the first door frame 20 in the top guide rail 16, corresponding to the position of FIG. 5B, the top riders 38 lock the first door frame 20 to the top guide rail 16 such that the first door frame 20 can only be translated along a guide direction defined by the guide rail 16; in particular, translation in a direction transversal to the first door frame plane P1 (FIG. 1) is prevented.

Figure 6:
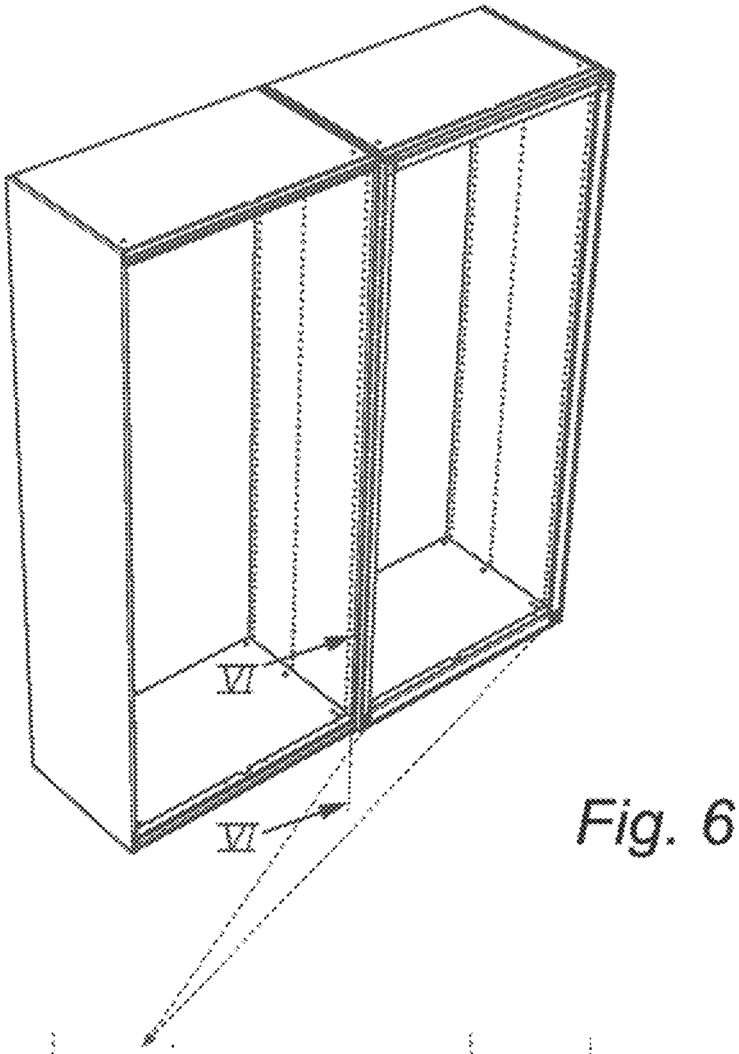
FIG. 6 is a perspective view of the closet of FIG. 5 after having suspended the door frame to the closet.
Figure 6A:
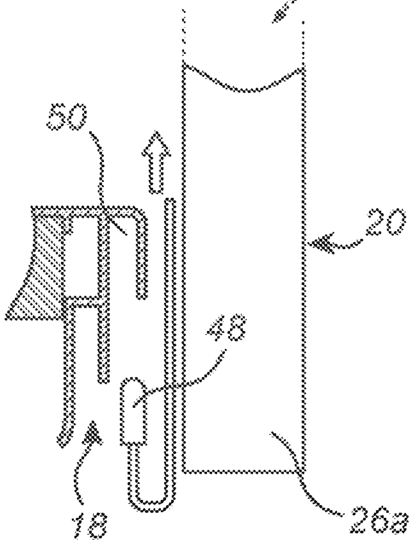
FIG. 6A is a section of a portion of the view of FIG. 6, the section taken along the vertical plane indicated by the line VI-VI of FIG. 6, and illustrates the attachment of a bottom rider to the door frame.
Figure 6B:
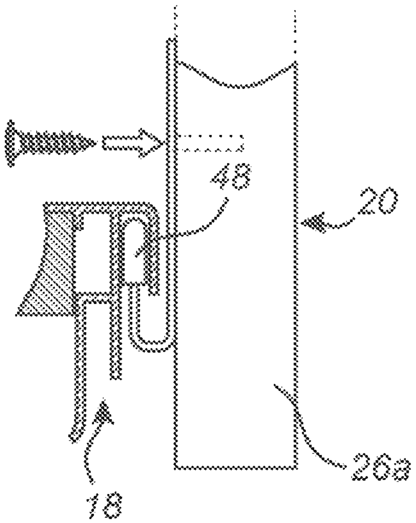
FIG. 6B is a section corresponding to the view of FIG. 6A, and illustrates the closet of FIG. 6 after having attached the bottom rider to the door frame.

After suspending the first door frame 20, and now with reference to FIGS. 6A and 6B, bottom riders 48 are hooked into a first, outer guide track 50 of the bottom guide rail 18, and attached to the bottom corners of the first door frame 20 by screwing to the respective frame joint members 32 (FIG. 2) in a manner similar, mutatis mutandis, to the attachment of the top riders 38. The bottom riders 48 hang freely in the bottom guide rail 18, but prevent accidental pivoting of the first door frame 20 about the top guide rail 16 (FIG. 5).

Referring back to FIG. 4A, after hanging the first door frame 20 in the top guide rail 16, the exact position of the first door frame 20 may be finely adjusted by loosening the attachment screws 42 slightly, and adjusting the position of the top rider 38 within the range permitted by the elongate attachment and adjustment holes 44.

Figure 7:
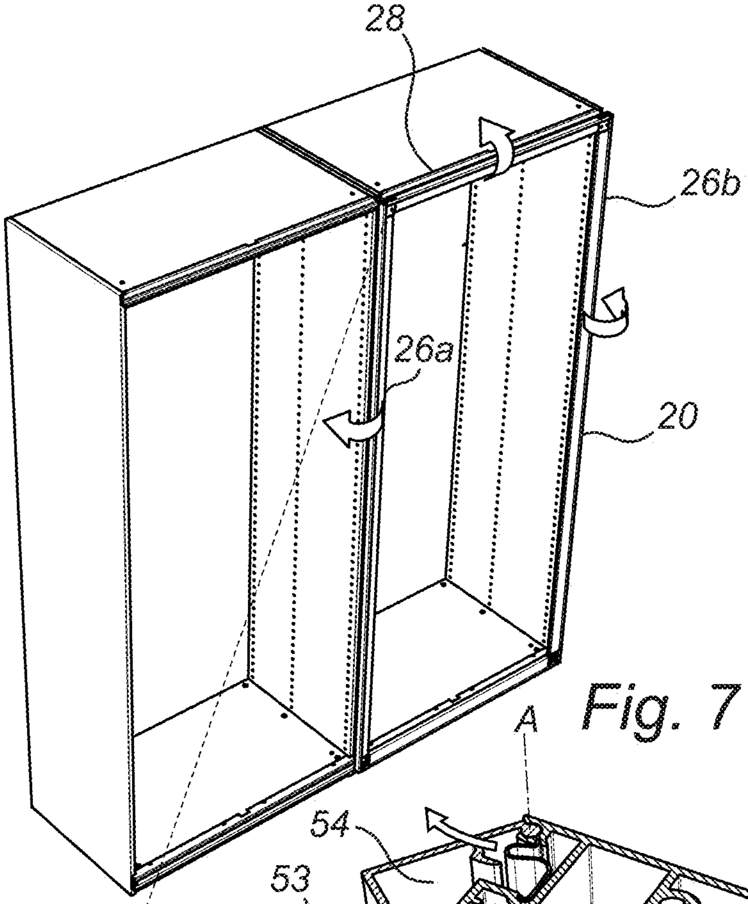
FIG. 7 is a perspective view of the closet of FIG. 6, and illustrates a preparation of the door frame for receiving door panels, wherein top and side edge strip arrangements of the door frame are flipped open by moving respective lock strips from a lock position to an open position.
Figure 7B:
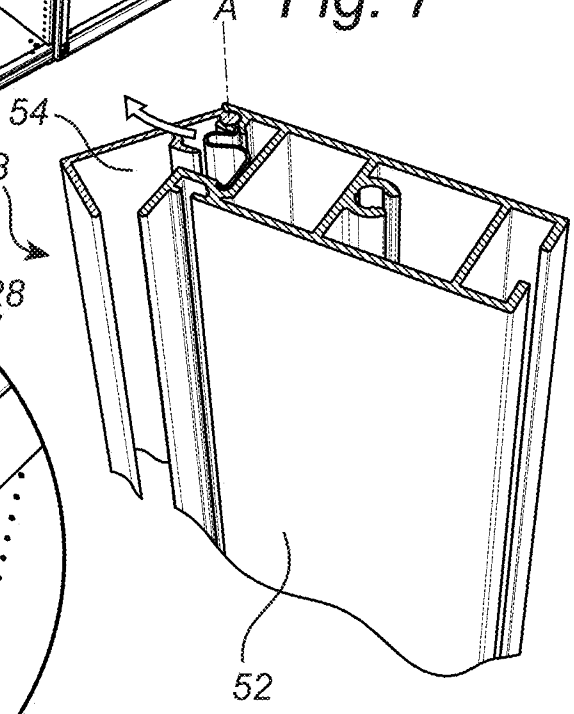
FIG. 7B is a section of the first side edge strip arrangement, the section taken along the horizontal plane indicated by the line VIIB-VIIB of FIG. 7, and illustrates the opening of the respective lock strips from the lock position to the open position.
Figure 7A:
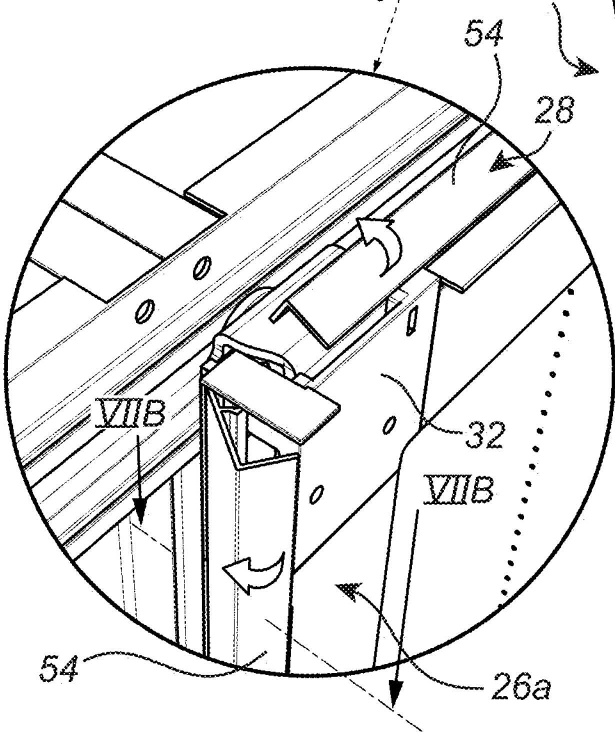
FIG. 7A is a magnified view of a portion of the view of FIG. 7, the magnified view illustrating a door frame corner between the first side edge strip arrangement and the top edge strip arrangement.

Now turning to FIG. 7, and to the magnified view of FIG. 7A, each of the first side edge strip arrangement 26*a*, the second side edge strip arrangement 26*b*, and the top edge strip arrangement 28 is openable and closable, for receiving the door panels 22*a-d* (FIG. 1) in a manner which will be illustrated in greater detail.

FIG. 7B illustrates a section of the first side edge strip arrangement 26*a*, the section being taken along the horizontal plane VIIB-VIIB indicated in FIG. 7A. The first side edge strip arrangement 26*a* comprises a respective support strip 52, which is firmly and rigidly attached to the adjacent strip arrangements 28, 30 (FIG. 3) of the first door frame 20 via the frame joint members 32, and a respective lock strip 54, the purpose of which will be elucidated in the following. The lock strip 54 attaches the panels 22*a-d* (FIG. 1) to the door frame, and accordingly operates as an attachment arrangement 53. The lock strip 54 is pivotally connected to the support strip 52 to permit pivoting about a pivot axis A, parallel to the respective support strip 52, between an open position, illustrated in FIG. 7B, and a lock position illustrated in FIG. 10B. Continuing with reference to FIG. 7B, the support and lock strips 52, 54 are configured as extruded profiles, and the pivot axis A is defined by a hinge formed directly by the respective extruded profiles. The second side edge strip arrangement 26*b* and the top edge strip arrangement 28 are made up in a similar manner, and each comprise a respective support strip 52 and a respective lock strip 54, albeit with a different orientation in space, as is apparent in the view of FIG. 7. Curved arrows in FIGS. 7, 7A and 7B illustrate how the respective strip arrangements 26*a*, 26*b* and 28 are opened by pivoting the respective lock strips 54 about respective pivot axes A, thereby preparing the first door frame 20 for receiving the door panels 22*a-d* (FIG. 1).

Figure 8A:
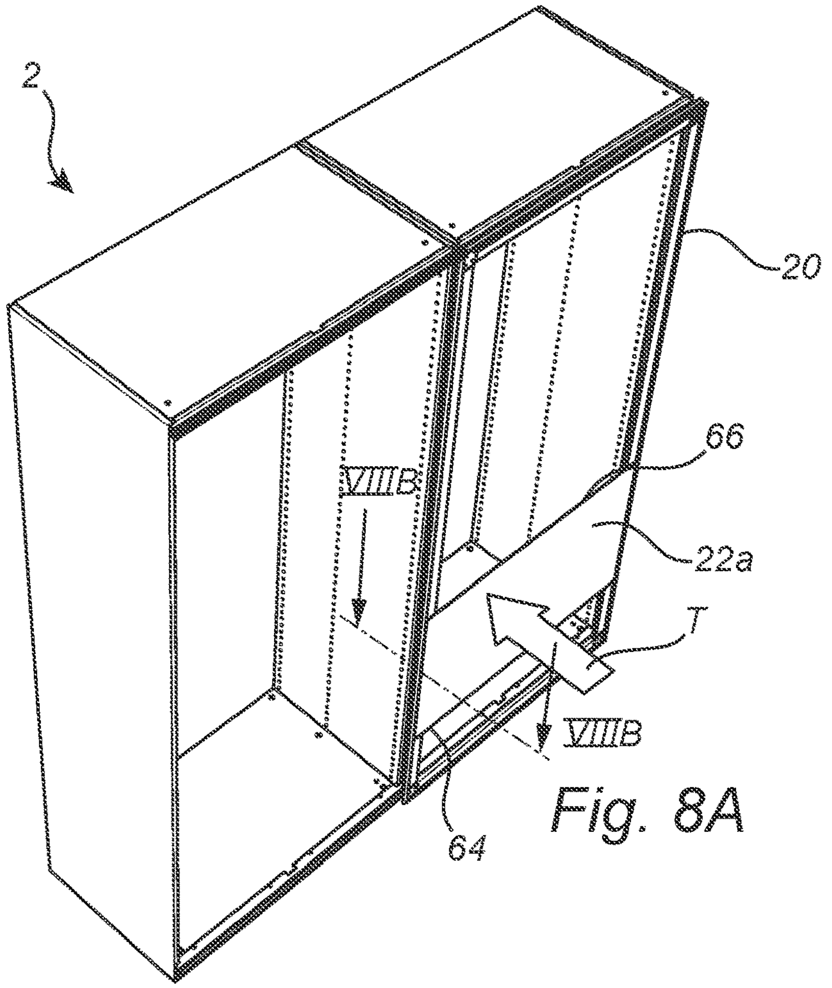
FIG. 8A is a perspective view of the closet of FIG. 7, and illustrates the insertion of a first door panel into the door frame.

FIG. 8A illustrates the insertion of the first door panel 22*a* into the first door frame 20. Now that the lock strips 54 are open, they allow, while holding the first door panel 22*a* parallel to the first door frame plane P1, free passage of the first door panel 22*a* from the exterior space outside the closet 2, into the first door frame 20 along an insertion direction T which is perpendicular to the first door frame plane P1 (FIG. 1).

Figure 8B:
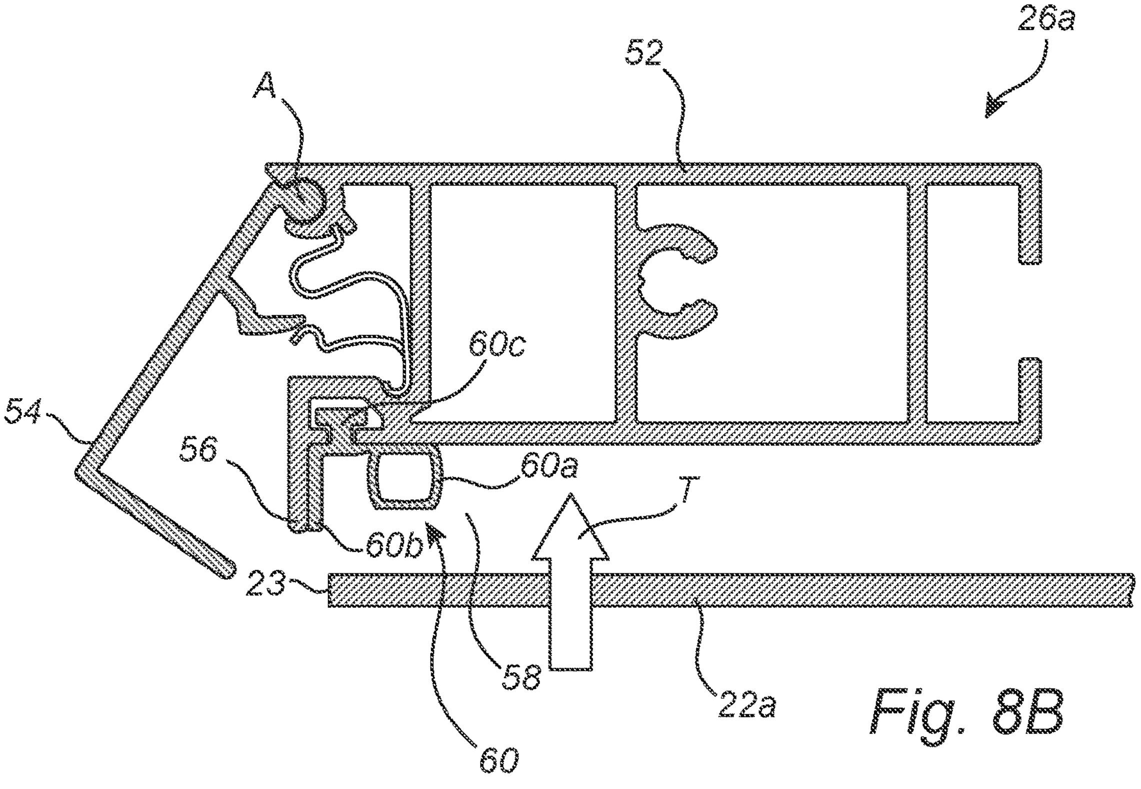
FIG. 8B is a section of the first side edge strip arrangement and the door panel, the section taken along the horizontal plane indicated by the line VIIIB-VIIIB of FIG. 8A.

FIG. 8B illustrates the same situation in a horizontal section taken along VIIIB-VIIIB indicated in FIG. 8A. The support strip 52 is provided with an outer frame edge 56 extending perpendicular to the first door frame plane P1 (FIG. 1), which outer frame edge 56 defines, together with similar outer frame edges of the other strip arrangements 26*b*, 28, 30 (FIG. 3), a rectangular outer perimetric boundary of a rectangular door panel space 58 for receiving the first door panel 22*a* once inserted. A perimetric edge 23 of the first door panel 22*a* freely passes the lock strip 54 to be received in the door panel space 58.

A compressible sealing strip 60 is configured to be squeezed between the first door panel 22*a* and the respective support strip 52. The sealing strip 60 takes up any play between said first door panel 22*a* and the respective support and lock strips 52, 54, which eases manufacturing tolerances. The sealing strip 60 comprises, as seen in the cross-section of FIG. 8B, a bulb 60*a* configured to seal in the direction perpendicular to the first door frame plane P1 (FIG. 1), a lip 60*b* configured to seal in a direction along the first door plane P1, and a foot 60*c* holding the sealing strip 60 to the support strip 52.

Figure 8C:
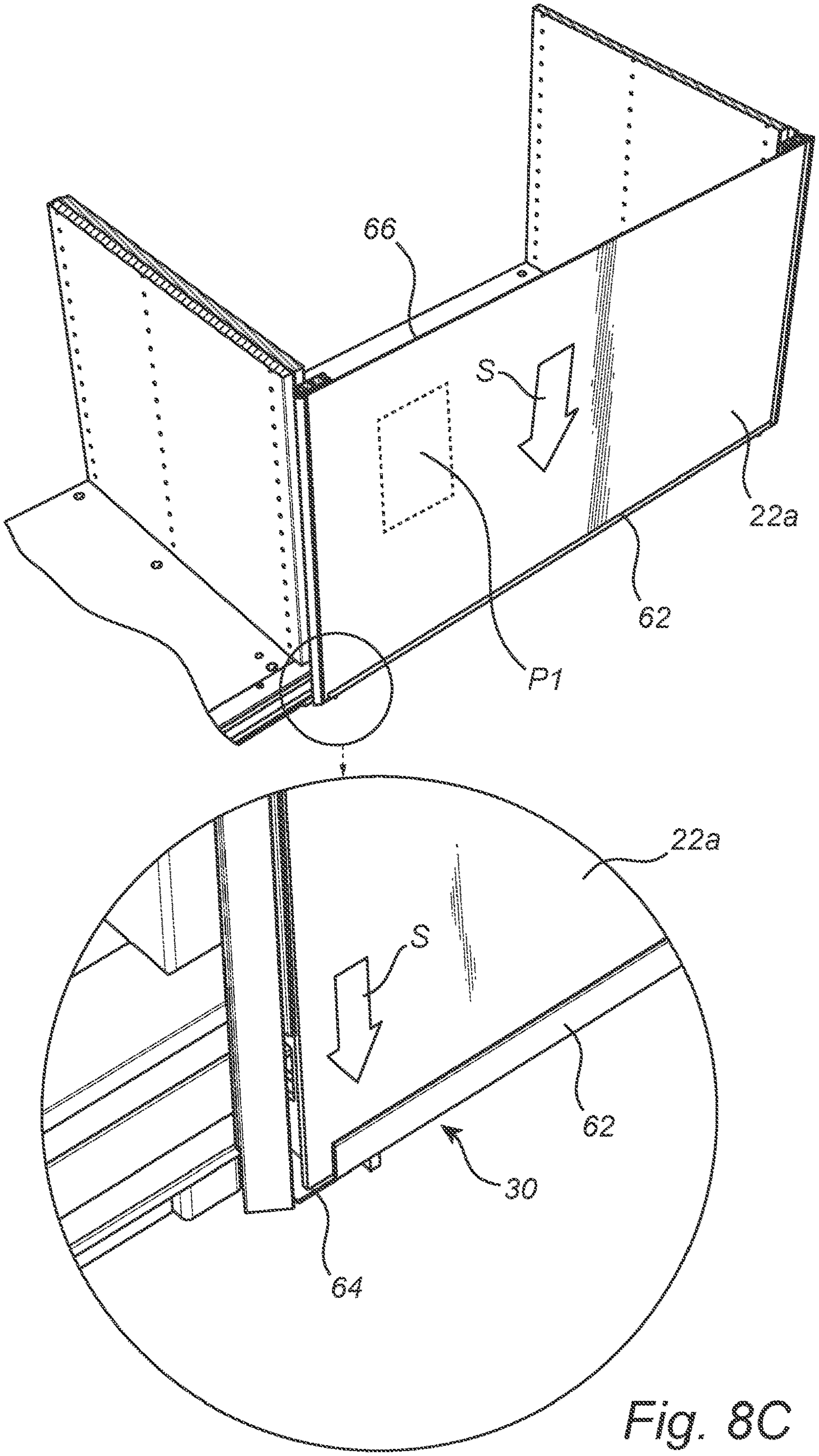
FIG. 8C is a perspective view of a section of a right-hand portion of the closet, the section taken along the vertical plane indicated by the line VIIIB-VIIIB of FIG. 8A, along with a magnified view of a lower edge of the door frame and first door panel.

Now turning to FIG. 8C, after inserting the first door panel 22*a* in the first door frame 20 (FIG. 3), the first door panel 22*a* is moved downwards along the first door frame plane P1 along a sliding direction S to come to a vertical rest within the bottom edge strip arrangement 30, such that the weight of said first door panel 22*a* is carried by the bottom edge strip arrangement 30. The bottom edge strip arrangement 30 is not provided with a lock strip. Instead, it comprises a bottom support strip 62 which is rigidly joined to the adjacent strip arrangements 26*a*, 26*b* (FIG. 3), again via frame joint members 32. The bottom support strip 62 defines a fixed, U-shaped panel support groove, the groove opening of which faces upwards in the direction of the first door frame plane P1. The panel support groove is configured to receive a bottom edge 64 of the first door panel 22*a* in an edge insertion direction along the door frame plane, the edge insertion direction corresponding to the sliding direction S. The bottom edge strip arrangement 30 may also comprise a sealing strip (not illustrated), which may be located in the panel support groove.

In the view of FIG. 8C, the bottom edge 64 of the first door panel 22*a* is confined within the first door frame plane P1 by the bottom edge strip arrangement 30, but the first door panel 22*a* is still free to pivot about the line of engagement with the bottom edge strip arrangement 30. The attachment of the top edge 66 of the first door panel 22*a* to the first door frame 20 will now be described in detail with reference to FIGS. 9A-9H.

Figure 9A:
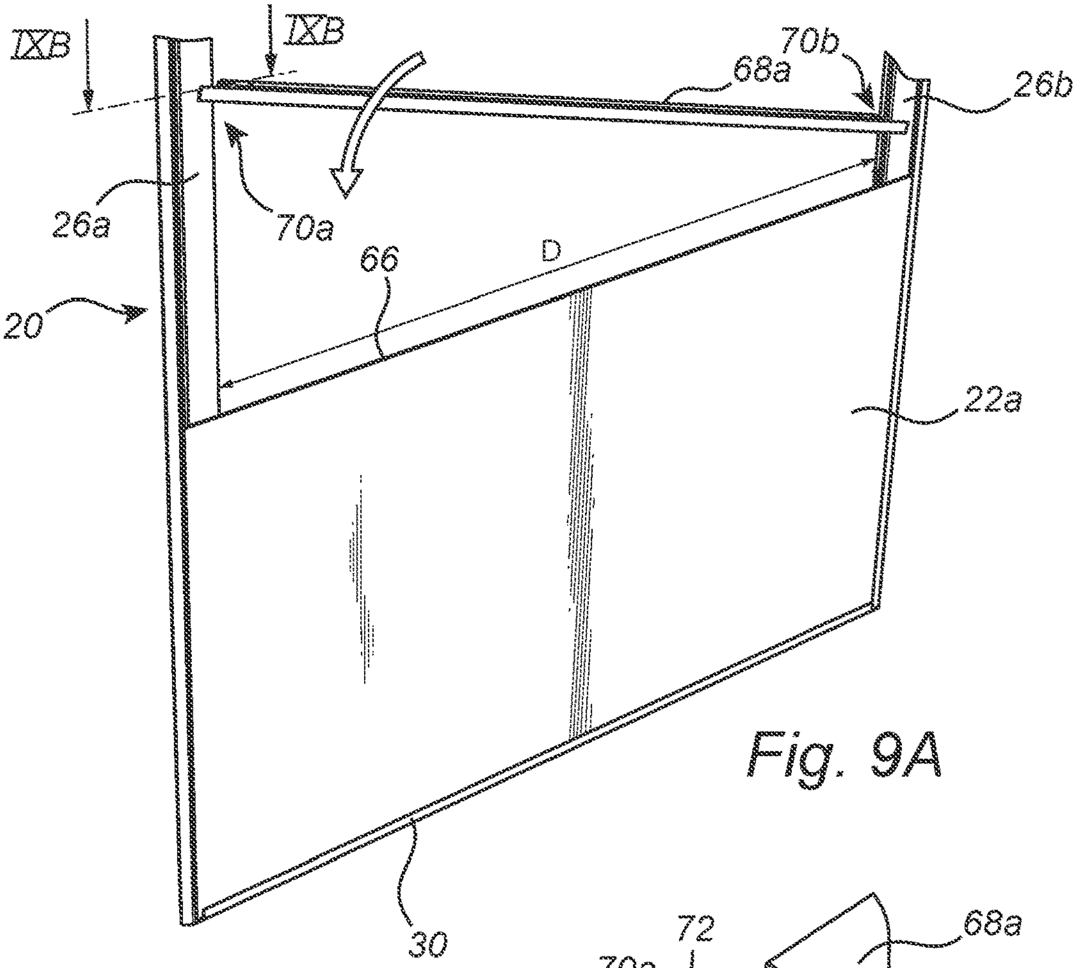
FIG. 9A is a view in perspective of the door frame of FIG. 8C, with an upper portion of the door frame broken away, the door frame having received the first door panel, the view illustrating the positioning of a first divider strip on top of the first door panel.

Starting with FIG. 9A, a first divider strip 68*a* is inserted into the first door frame 20 and positioned on top of the first door panel 22*a*. The first divider strip 68*a* is slightly longer than the horizontal distance D between the first and second side edge strip arrangements 26*a*, 26*b*, such that the first divider strip 68*a* has an inclined posture when inserted into the first door frame 20.

Figure 9B:
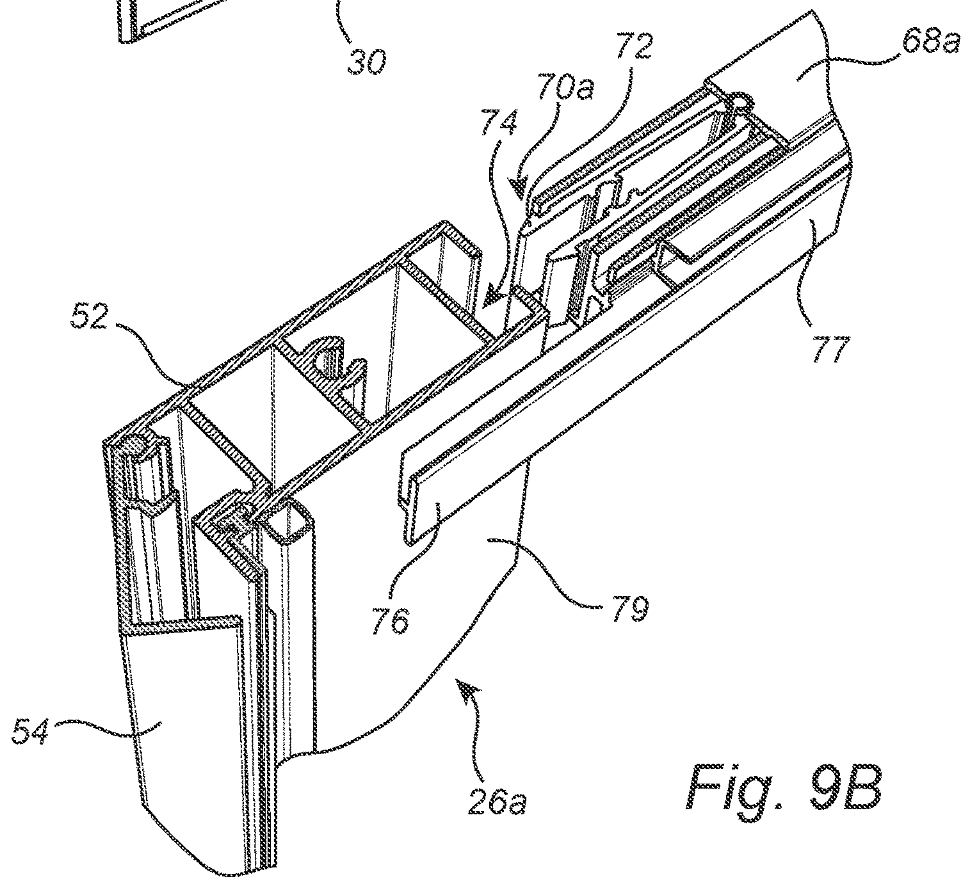
FIG. 9B is a perspective view of a section of the first side edge strip arrangement and the first divider strip of FIG. 9A, the section taken along a horizontal plane indicated by the line IXB-IXB indicated in FIG. 9A.
Figure 10A:
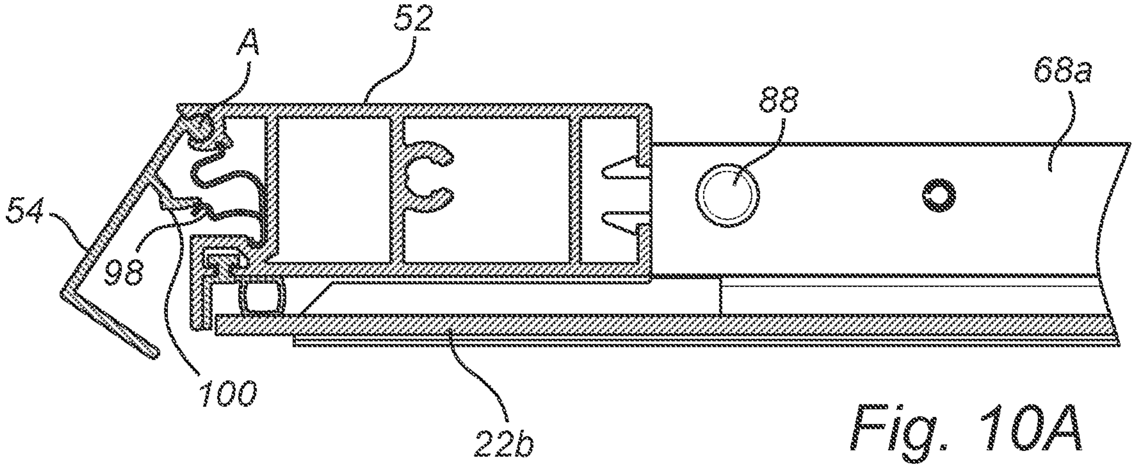
FIG. 10A illustrates a section of a leftmost portion of the door frame of FIG. 9H after having received all respective door panels and divider strips illustrated in FIG. 1, the section taken along a horizontal line indicated by the line X-X in FIG. 9G, wherein the first side edge strip arrangement is illustrated in an open position.

FIG. 9B illustrates the section IXB-IXB, indicated in FIG. 9A, in perspective and in greater detail. The first divider strip 68*a* is configured as an extruded profile. A first longitudinal end 70*a* of the first divider strip 68*a* has a male lock insert 72 configured to be inserted in a respective lock groove 74 extending along the length of the support strip 52 of the first side edge strip arrangement 26*a*. For clarity of illustration, a portion of the top face of the first divider strip 68*a* is broken away; the actual extent of the top face is illustrated in FIG. 10A. The second longitudinal end 70*b* (FIG. 9A) of the first divider strip 68*a* has the same shape and function as the first longitudinal end 70*a*, albeit in a mirror configuration, to be inserted into a respective similar lock groove extending along the length of the support strip of the second side edge strip arrangement 26*b* (FIG. 9A). The lock grooves 74 of the side edge strip arrangements 26*a*, 26*b* face towards each other, such that the male lock inserts 72 of the longitudinal ends 70*a*, 70*b* (FIG. 9A) of the first divider strip 68*a* will be pressed into the respective opposite lock grooves 74 of the first and second side edge strip arrangements 26*a*, 26*b* (FIG. 9A) when the first divider strip 68*a* is brought to a horizontal posture on the top edge 66 of the first door panel 22*a*. Front trim extensions 76, forming longitudinal extensions of a front trim portion 77 of the first divider strip 68*a*, extend longitudinally beyond the respective male lock inserts 72, along outside faces 79 of the support strips 52.

Figure 9C:
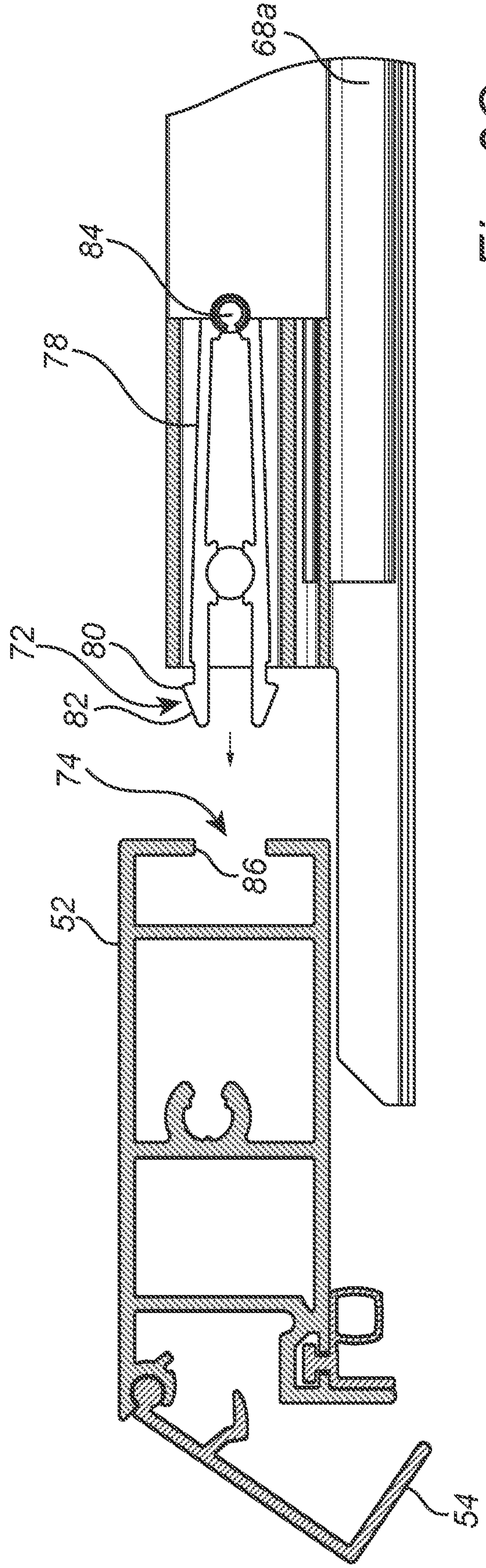
FIG. 9C is a section of the first side edge strip arrangement and the first divider strip of FIG. 9B, the section taken along a horizontal plane at the same vertical position in relation to the divider strip as that of FIG. 9B, and illustrates a first intermediate state of attaching the first divider strip to the first side edge strip arrangement.
Figure 9D:
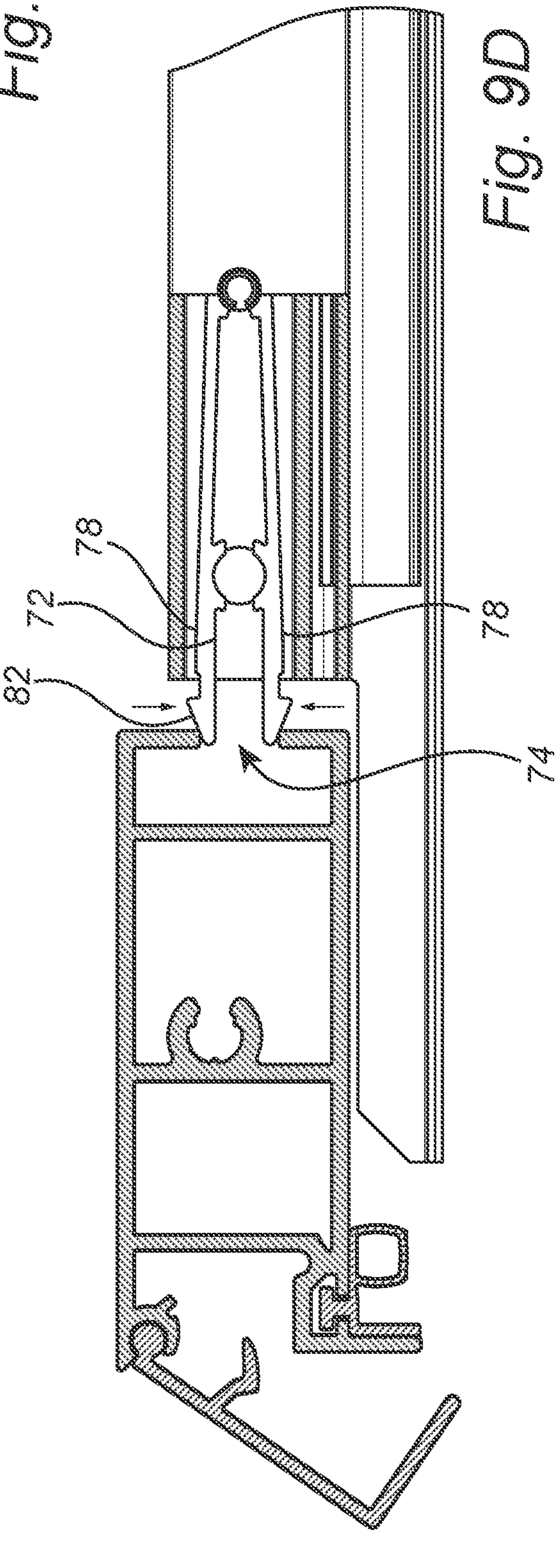
FIG. 9D is a section of the first side edge strip arrangement and the first divider strip of FIG. 9C, the section taken along a horizontal plane at the same vertical position in relation to the divider strip as that of FIG. 9C, and illustrates a second intermediate state of attaching the first divider strip to the first side edge strip arrangement.
Figure 9E:
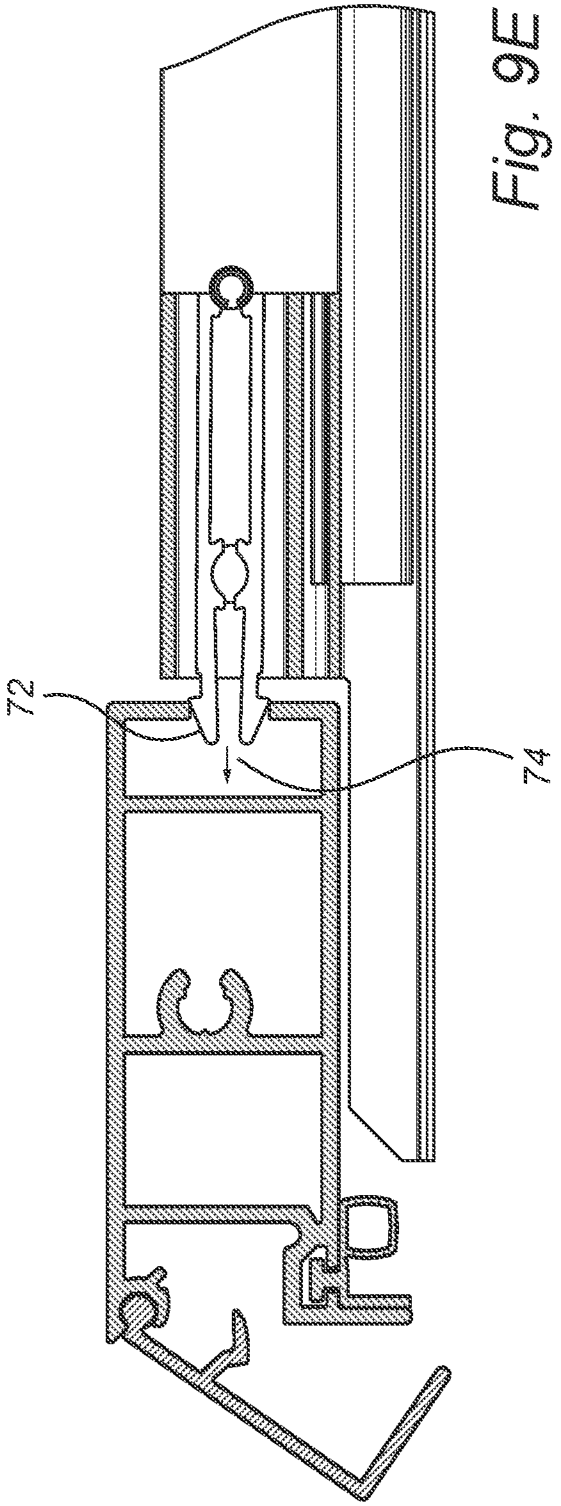
FIG. 9E is a section of the first side edge strip arrangement and the first divider strip of FIG. 9D, the section taken along a horizontal plane at the same vertical position in relation to the divider strip as that of FIG. 9D, and illustrates a third intermediate state of attaching the first divider strip to the first side edge strip arrangement.

The sections of FIGS. 9C-9E illustrate the positioning and attachment of the divider strip 68*a* as seen straight from above. Again, a portion of the top face of the first divider strip 68*a* is broken away to expose a major portion of the male lock insert 72. The male lock insert 72 is configured as a resiliently compressible, V-shaped crocodile clamp comprising a pair of spring arms 78 extending alongside each other. The free ends of the spring arms 78 are provided with compression ramps 82 and barbs 80, whereas the spring arm ends opposite to the free ends are joined with each other and attached to the first divider strip 68*a* by a rivet 84.

FIG. 9C illustrates with an arrow the insertion of the male lock insert 72 into the lock groove 74 of the support strip 52.

FIG. 9D illustrates with arrows how the compression ramps 82 of the male lock insert 72 are pressed together, against the bias of the spring arms 78, by opposite edges 86 (FIG. 9C) of the lock groove 74.

FIG. 9E illustrates a position in which the male lock insert 72 has been pressed even further into the lock groove 74.

Figure 9F:
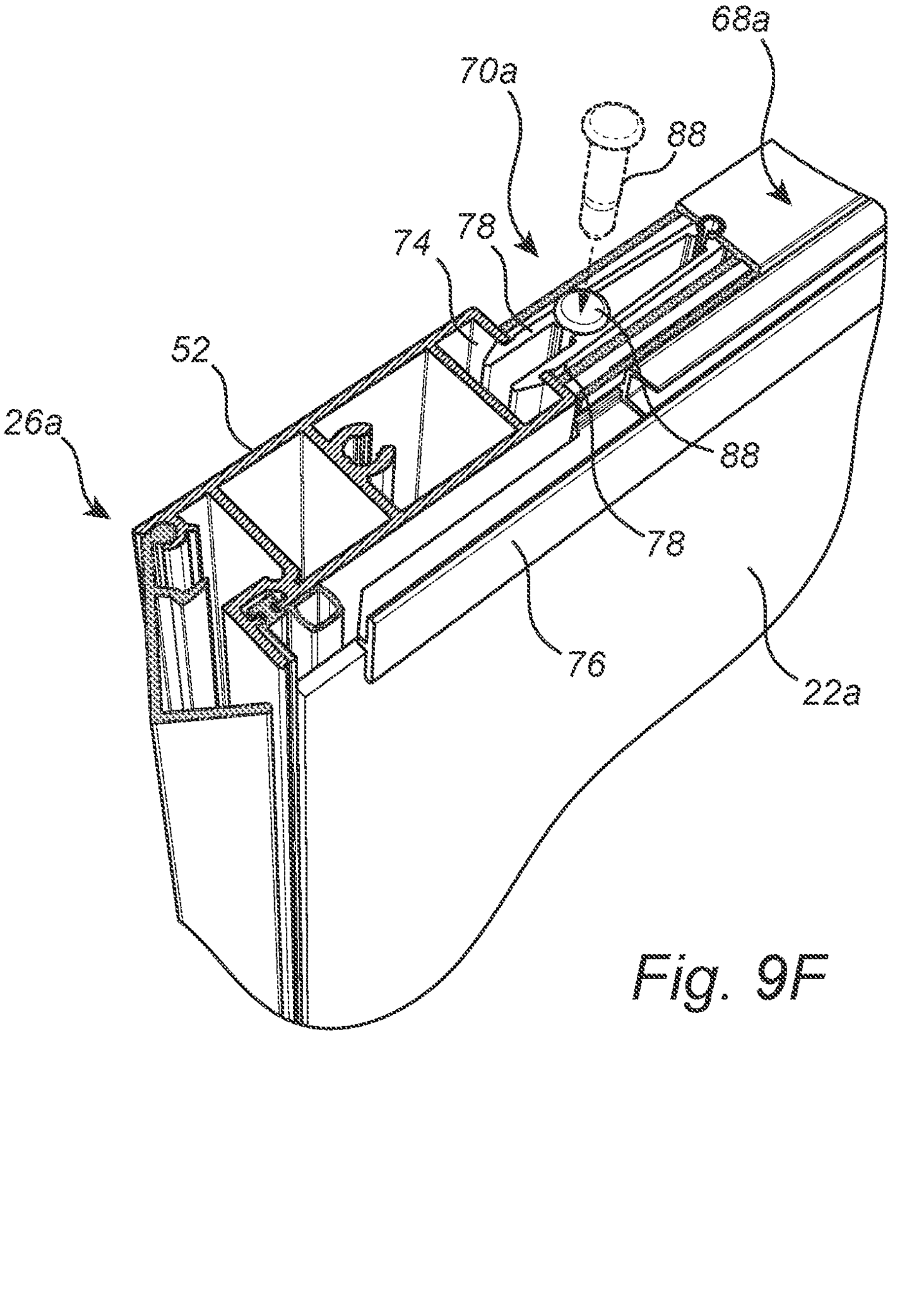
FIG. 9F is a perspective view of a section of the first side edge strip arrangement and the first divider strip of FIG. 9E, with a top face of the divider strip partly broken away, the section taken along a horizontal plane just above the divider strip, and illustrates a final state of attaching the first divider strip to the first side edge strip arrangement.

The perspective view of FIG. 9F illustrates the final position of the first divider strip 68*a* on top of the first door panel 22*a*. Once inside the lock groove 74, the free ends of the spring arms 78 have sprung back towards their original position prior to insertion, such that the barbs 80 (FIG. 9C) engage with the edges 86 (FIG. 9C) of the lock groove 74, thereby locking the first end 70*a* of the first divider strip 68*a* to the support strip 52 of the first side edge strip arrangement 26*a*. This position is locked in yet a further locking step, in which a clamping actuator configured as a plug 88 is inserted into a plug socket between the spring arms 78, so as to prevent inadvertent compression of the male lock insert 72 (FIG. 9C).

Figure 9G:
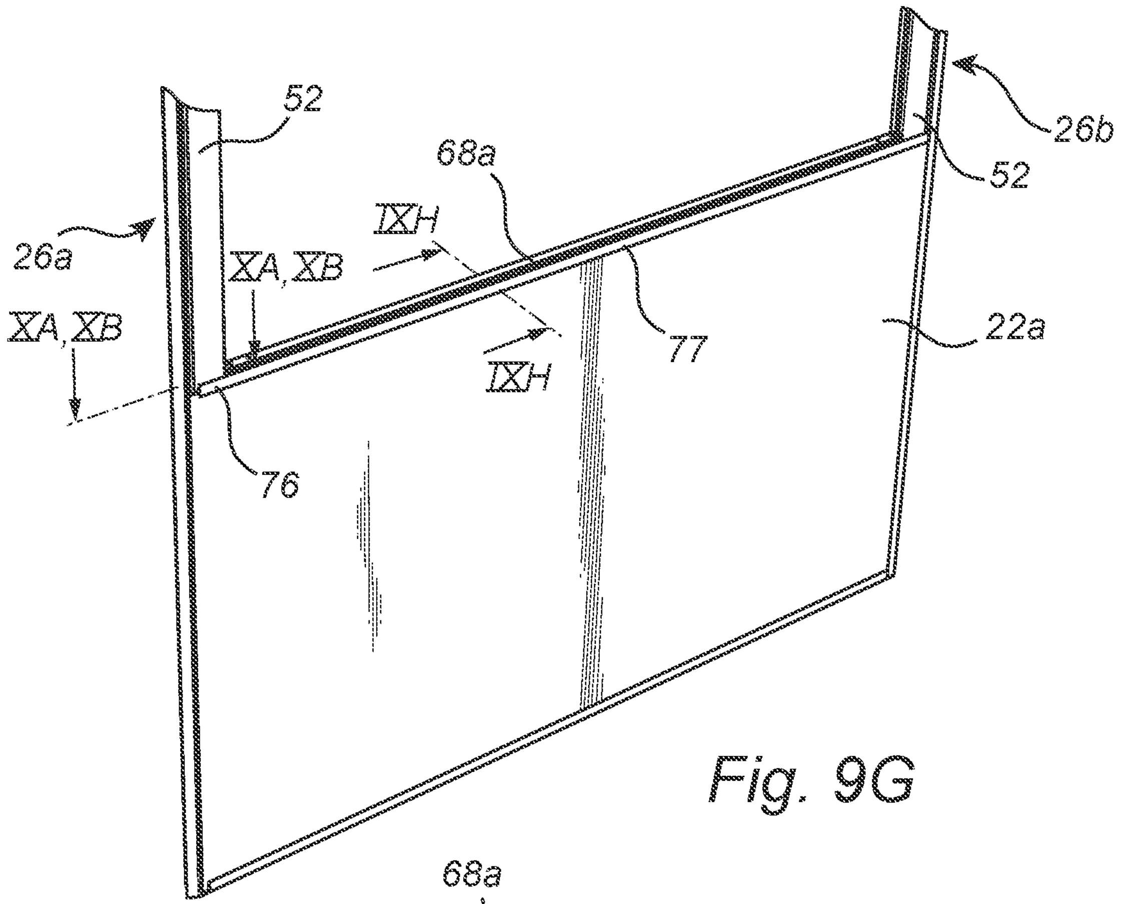
FIG. 9G is a view in perspective of the door frame, first door panel and first divider strip of FIG. 9A, with an upper portion of the door frame broken away, illustrating the door frame after the first door panel and the first divider strip have reached their final positions.

FIG. 9G also illustrates the final position of the first divider strip 68*a*. As is apparent from the view of FIG. 9G, once installed, the first door panel 22*a* and the front trim extensions 76 of the first divider strip 68*a* cover most of the outside faces 79 of the support strips 52 of the first and second side edge strip arrangements 26*a*, 26*b*.

Figure 9H:
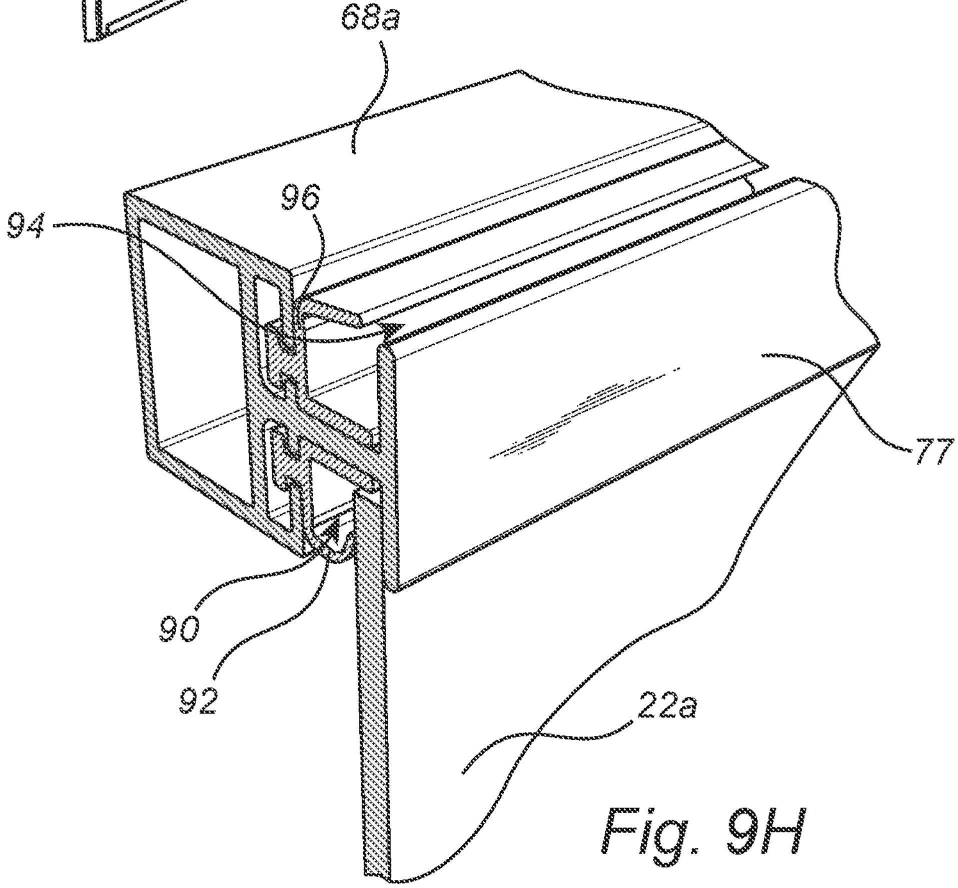
FIG. 9H is a perspective view of a section of the first divider strip and an upper portion of the first door panel of FIG. 9G, the section taken along a vertical plane indicated by the line IXH-IXH in FIG. 9G.

FIG. 9H in greater detail illustrates the section indicated by IXH-IXH in FIG. 9G. As is apparent from the section, the first divider strip 68*a* defines a downwards-facing first panel locking groove 90 which straddles the upper edge 66 of the first door panel 22*a*, thereby locking the upper edge 66 of the first door panel 22*a* to the door frame plane P1 (FIG. 1), and preventing the first door panel 22*a* from moving in a direction perpendicular to the first door frame plane P1. The first panel locking groove 90 is provided with a rubber sealing strip 92 for sealing between the first panel locking groove 90 and the first door panel 22*a*, thereby warranting a tight fit without any rattling over a wide range of door panel thicknesses. The first divider strip 68*a* is also provided with an upwards-facing second panel locking groove 94, which is configured to receive and straddle a bottom edge of the second door panel 22*b* (FIG. 1). The second panel locking groove 94 has the same support and locking function for the second door panel 22*b* (FIG. 1) as the panel support groove of the bottom support strip 62 (FIG. 8C) has for the first door panel. Consequently, after the first divider strip 68*a* has reached its final position of FIG. 9G, the second door panel 22*b* (FIG. 1) can be mounted into the first door frame 20 (FIG. 3) on top of the first divider strip 68*a* in the manner described for the first door panel 22*a* with reference to FIGS. 8A-8C, and locked to the first door frame 20 (FIG. 3) using a second divider strip 68*b* (FIG. 1), which may be identical to the first divider strip 68*a*, in the manned described with reference to FIGS. 9A-9F. Referring back to FIG. 1, the procedure may be iterated for as many door panel 22*a-d* and divider 68*a-c* strips as desired, such that the first door frame 20 defined by the side edge strip arrangements 26*a-b*, 28, 30 is divided into rectangular subframes by the divider strips 68*a-c*, each subframe enclosing a respective door panel 22*a-d*. The top edge of the uppermost door panel 22*d* (FIG. 1) does not need to be locked by a divider strip, as it will instead be locked to the first door frame plane P1 by the lock strip 54 (FIG. 7A) of the top edge strip arrangement 28 in a manner which will be apparent from the below description with reference to FIGS. 10A and 10B.

Figure 10B:
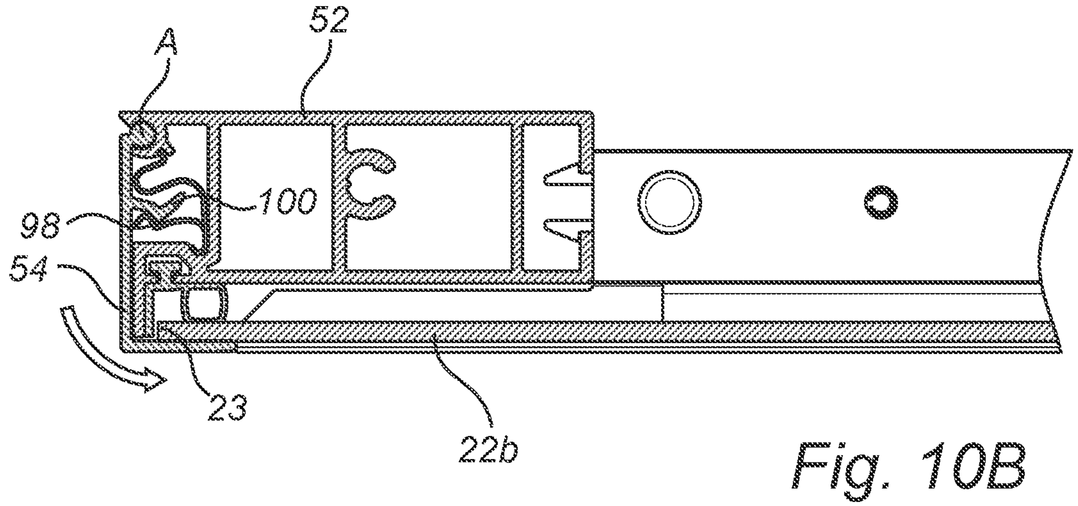
FIG. 10B is a section view corresponding to that of FIG. 10A, wherein the first side edge strip arrangement is illustrated in a lock position.

FIGS. 10A and 10B illustrate the door after having received all door panels 22*a-d* and divider strips 68*a-c* (FIG. 1). The door is illustrated in a section along a horizontal plane indicated by the line X-X of FIG. 9G, i.e. at the height of the second door panel 22*b* (FIG. 1). Even though FIGS. 10A and 10B illustrate the first side edge strip arrangement 26*a*, it will be appreciated that the second side edge strip arrangement 26*b* and the top edge strip arrangement 28 operate in the same manner, mutatis mutandis. Starting with FIG. 10A, which illustrates the lock strip 54 in the open position, the interface between the lock strip 54 and the support strip 52 comprises a support strip locking portion configured as a spring clip 98, which resiliently cams against a lock strip locking portion configured as a snap tongue 100 of the lock strip 54 to define a snap function for the lock strip's 54 rotary position about the pivot axis A. In order to go from the open position of FIG. 10A to the lock position of FIG. 10B, the lock strip 54 is pressed against the bias of the spring clip 98 until reaching the lock position of FIG. 10B, wherein the spring clip 98 snaps to a seated position behind the snap tongue 100. When in the lock position of FIG. 10B, the lock strip 54 locks the perimetric edge 23 of the door panels 22*a-d* (FIG. 1) within the door frame 20. In order to finalize the first sliding door 12, the lock strips 54 of the second side edge strip arrangement 26*b* and the top edge strip arrangement 28 are locked in the same manner, mutatis mutandis, such that all perimetric edges of each door panel 22*a-d* are locked to the first door frame plane P1 by a lock strip 54, a divider strip 26*a-c*, or a fixed-groove strip 30.

Figure 11:
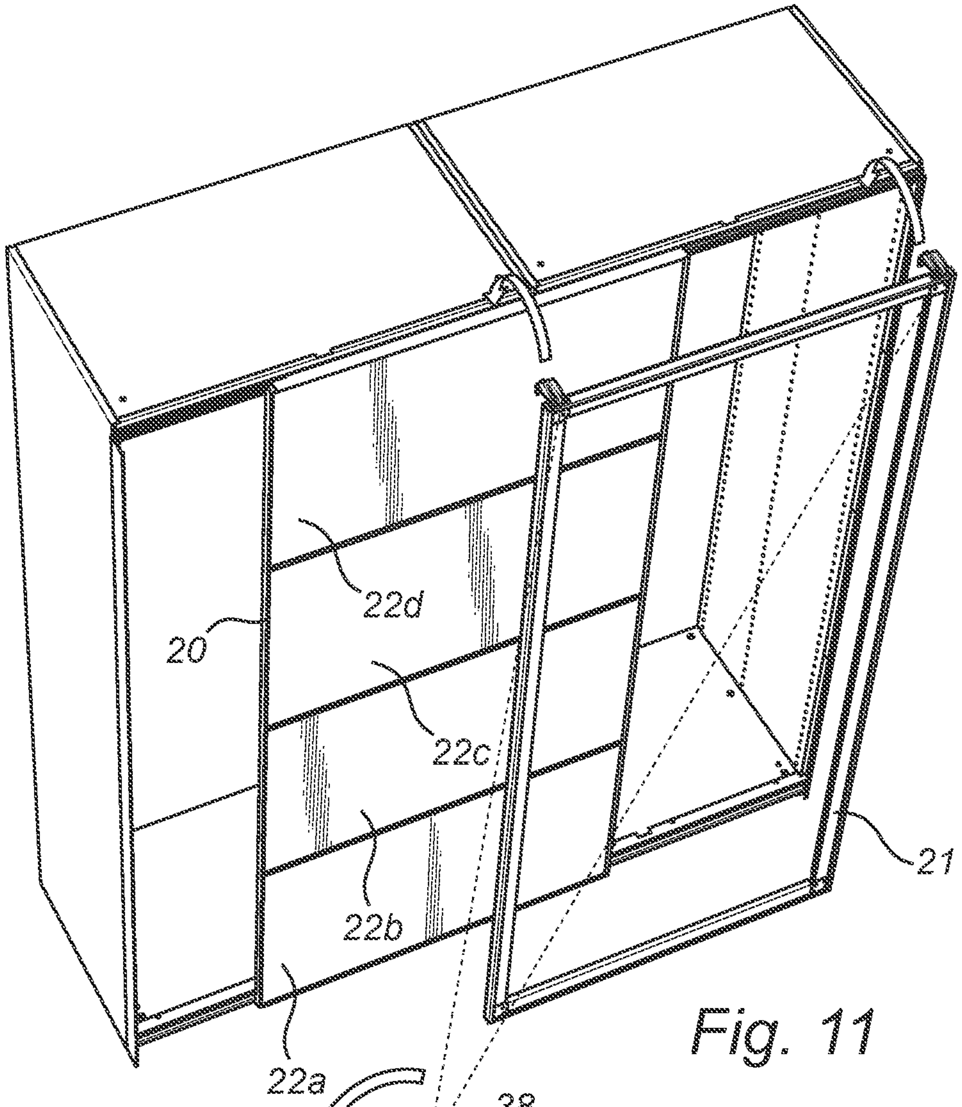
FIG. 11 is a perspective view of the closet of FIG. 5 after having completed assembly of a first door, illustrating the suspension of a second door frame to the closet by engaging top riders of the door frame with the top guide rail of the closet.
Figure 11A:
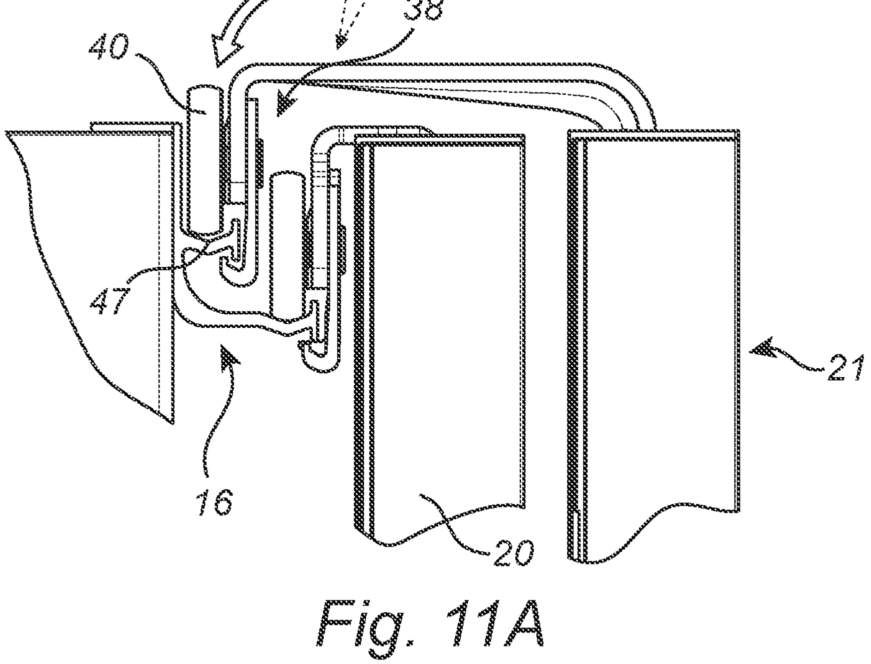
FIG. 11A illustrates a section of a portion of the view of FIG. 11, the section corresponding to the view of FIG. 5B and taken along the vertical plane indicated by the line V-V of FIG. 5, and illustrates the closet of FIG. 11 after having engaged the top riders of the second door frame with the top guide rail.
Figure 11B:
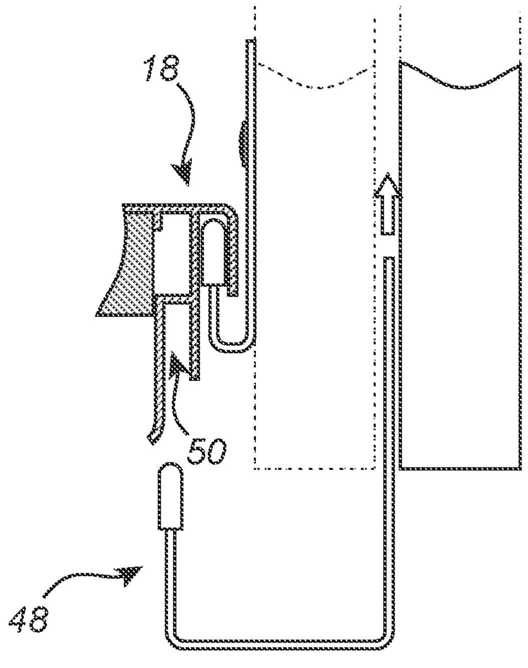
FIG. 11B illustrates a section of a portion of the view of FIG. 11, the section corresponding to the view of FIG. 6A and taken along the vertical plane indicated by the line VI-VI of FIG. 6, and illustrates the attachment of a bottom rider to the door frame.
Figure 11C:
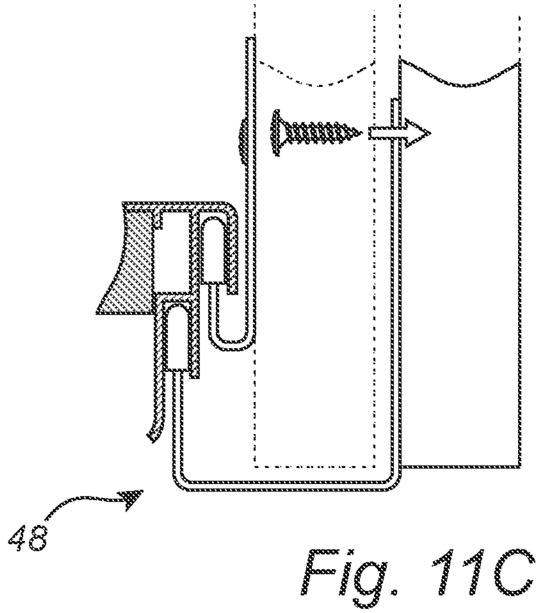
FIG. 11C is a section corresponding to the view of FIG. 11B, and illustrates the closet of FIG. 11 after having attached the bottom riders to the door frame.

Having reached the position of FIG. 11 following the assembly method illustrated hereinabove, all door panels 22*a-d* have been attached to the door frame 20 without the use of any tools, which provides for a simple and convenient assembly of the first sliding door 12. Referring back to FIG. 1, the second sliding door 14 can be assembled in the very same manner. First, a second door frame 21 is assembled in the manner illustrated for the first door frame 20 in FIGS. 2-4B. Thereafter, with reference to FIG. 11 and the detail view of FIG. 11A, the second door frame 21 is hooked onto the top guide rail 16 by positioning the guide wheels 40 of the second door frame 21 in a second, inner guide track 47 of the top guide rail 16, and pivoting the second door frame 21 about a pivot axis defined by the line of engagement between the guide wheels 40 and the top guide rail 16. After having suspended the second door frame 21 in the top guide rail 16, corresponding to the position of FIG. 11A, the top riders 38 of the second door frame 21 lock the second door frame 21 to the top guide rail 16 such that the second door frame 21 can only be translated along a guide direction defined by the guide rail 16; in particular, translation in a direction transversal to the first door frame plane P1 is prevented. After suspending the second door frame 21, and now with reference to FIGS. 11B and 11C, bottom riders 48 are hooked into a second, inner guide track 50 of the bottom guide rail 18, and attached to the bottom corners of the second door frame 21 by screwing to the respective frame joint members 32 (FIG. 2) in a manner similar, mutatis mutandis, to the attachment of the top riders 38. The bottom riders 48 hang freely in the bottom guide rail 18, but prevent accidental pivoting of the second door frame 21 about the top guide rail 16 (FIG. 11A).

After hanging the second door frame 21 in the top guide rail 16, the exact position of the second door frame 21 may be finely adjusted by loosening the attachment screws 42 (FIG. 4A) slightly, and adjusting the position of the top rider 38 within the range permitted by the elongate attachment and adjustment holes 44. After having adjusted the position of the second door frame 21, door panels 22*a-d* (FIG. 1) may be attached to the second door frame 21 in the same manner as that described for the first door frame 20 with reference to FIGS. 7-10B.

Figure 12:
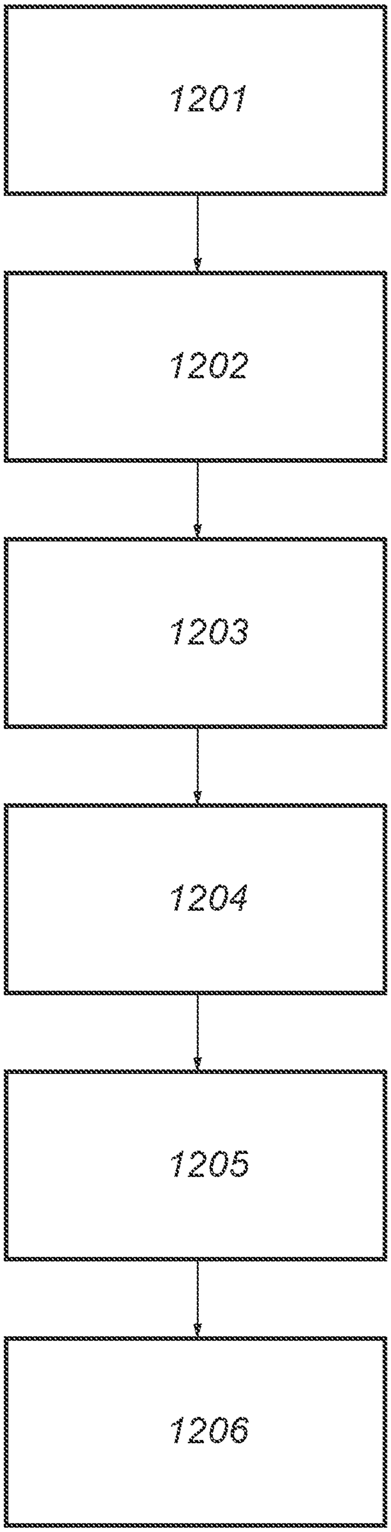
FIG. 12 is a flow chart illustrating a method of assembling a sliding closet door.

FIG. 12 illustrates a method of assembling a sliding closet door, for example the first sliding closet door 12 of FIG. 1. The method comprises the steps

1201: providing a door frame 20 extending in a door frame plane P1;

1202: connecting the door frame 20 to a door guide rail 16 configured to enable sliding the door frame 20 along a vertical plane coinciding with the door frame plane P1;

1203: operating an adjustment arrangement 42, 44 (FIG. 4A) to adjust the position of the door frame 20 in relation to the door guide rail 16:

1204: mounting a first door panel 22*a* in the door frame 20 by inserting the door panel 22*a* into the door frame 20 in an insertion direction T (FIG. 8A) transversal to the door frame plane P1;

1205: mounting a first divider strip 68*a* to the door frame 20, the first divider strip 68*a* dividing the door frame 20 into a first subframe and a second subframe, the first subframe holding said first door panel 22*a*; and

1206: mounting a second door panel 22*b* in said second subframe.

The invention has mainly been described above with reference to a few embodiments. However, as is readily appreciated by a person skilled in the art, other embodiments than the ones disclosed above are equally possible within the scope of the invention, as defined by the appended patent claims. For example, even though, in the illustrated embodiments, the door has been suspended in a top guide rail, the door may equally well rest upon a bottom guide rail. Moreover, a sliding closet door suspended in a designated closet frame, which may be positioned as a stand-alone closet within a room, has been described in detail hereinabove. However, the teachings herein are equally applicable to a sliding closet door guided in rails attached to the floor, ceiling, and/or walls of the room as such, for example in a so-called floor-to-ceiling installation.

In the claims, the word "comprising" does not exclude other elements or steps, and the indefinite article "a" or "an" does not exclude a plurality.

The invention claimed is:

1. A sliding closet door assembly comprising:

a first door panel; and a door frame assembly comprising at least a first side edge strip arrangement, a second side edge strip arrangement, a top edge strip arrangement and a bottom edge strip arrangement, the first side edge strip arrangement, second side edge strip arrangement, top edge strip arrangement, and bottom edge strip arrangement configured to define a door frame extending in a door frame plane, the door frame being adapted to receive and hold said first door panel, wherein the door frame is configured to receive said first door panel in a door panel insertion direction (T) transversal to the door frame plane, wherein at least one of said first side edge strip arrangement, second side edge strip arrangement, top edge strip arrangement, and bottom edge strip arrangement comprises:

a support strip configured to be rigidly connected to adjacent strip arrangements of said first side edge strip arrangement, second side edge strip arrangement, top edge strip arrangement, and bottom edge strip arrangement; and a lock strip movable in relation to said support strip between an open position, in which the lock strip allows free passage of a respective door panel edge, of said first door panel, into the door frame, and a lock position, in which the lock strip locks said edge of said first door panel within the door frame.

2. The sliding closet door assembly according to claim 1, wherein at least one of the first side edge strip arrangement, second side edge strip arrangement, top edge strip arrangement, and a bottom edge strip arrangement comprises an attachment arrangement configured to attach said first door panel to the door frame.

3. The sliding closet door assembly according to claim 1, wherein said first door panel is lockable to the door frame via a snap-lock.

4. The sliding closet door assembly according to claim 1, wherein said lock strip is pivotally connected to the support strip, to pivot about a pivot axis (A) parallel to the support strip, between said open position and said lock position.

5. The sliding closet door assembly according to claim 1, wherein said at least one of said first side edge strip arrangement, second side edge strip arrangement, top edge strip arrangement, and bottom edge strip arrangement further comprises a compressible sealing strip configured to be squeezed between said first door panel and at least one of said support strip and said lock strip.

6. The sliding closet door assembly according to claim 1, wherein at least one of said support strip and said lock strip is configured as an extruded profile.

7. The sliding closet door assembly according to claim 1, wherein the lock strip is lockable in the locking position by an interlocking engagement between a support strip locking portion and a mating lock strip locking portion.

8. The sliding closet door assembly according to claim 1, wherein at least one of said support strip and said lock strip is configured as an extruded profile, wherein the lock strip is lockable in the locking position by an interlocking engagement between a support strip locking portion and a mating lock strip locking portion, wherein a shape of said extruded profile of said at least one of said support strip and said lock strip defines said at least one of said support strip locking portion and said lock strip locking portion.

9. The sliding closet door assembly according to claim 1, wherein said lock strip is configured to cover, when in said lock position, an outer face of said door panel edge.

10. The sliding closet door assembly according to claim 1, wherein at least one of said first side edge strip arrangement, second side edge strip arrangement, top edge strip arrangement, and bottom edge strip arrangement is configured as a strip arrangement not having a lock strip, and/or wherein at least one of said first side edge strip arrangement, second side edge strip arrangement, top edge strip arrangement, and bottom edge strip arrangement is configured as a fixed-groove strip arrangement comprising a fixed groove configured to receive a respective door panel edge in an edge insertion direction along the door frame plane (P1), and/or wherein said door frame is configured to, after having received said first door panel, vertically support said first door panel prior to locking the first door panel to the door frame, and/or wherein the sliding closet door assembly is configured to define an inside face facing an interior of a closet, and an opposite outside face facing an exterior space, wherein the door frame is configured to receive said first door panel in a door panel insertion direction (T) from the exterior space.

11. The sliding closet door assembly according to claim 1, further comprising:

a second door panel; and a divider strip configured to divide the door frame into a first subframe and a second subframe, the first subframe configured to hold said first door panel and the second subframe configured to hold said second door panel.

12. The sliding closet door assembly according to claim 11, wherein the divider strip is configured to straddle an edge of at least one of the first and second door panels.

13. The sliding closet door assembly according to claim 11, wherein the divider strip is configured to be positioned on top of said first door panel, and the second door panel is configured to be positioned on top of the divider strip.

14. The sliding closet door assembly according to claim 11, wherein the divider strip is configured to be attached to at least one of said first and second side edge strip arrangements.

15. The sliding closet door assembly according to claim 11, wherein the divider strip is configured to be attached to said at least one of said first and second side edge strip arrangements via a clamping arrangement, wherein the clamping arrangement is provided with barbs which, when clamped, lock the divider strip to the at least one of said first and second side edge strip arrangements.

16. The sliding closet door assembly according to claim 14, wherein two longitudinal ends of the divider strip are configured to, when mounted in the door frame, be inserted in respective grooves extending along the respective first and second side edge strip arrangements.

17. The sliding closet door assembly according to claim 1, wherein said first door panel is tool-less attachable to the door frame, and/or the sliding closet door assembly further comprising a rider arrangement configured to ride in, and be guided by, a door guide rail extending along the door frame plane (P1; P2).

18. A method of assembling a sliding closet door, the method comprising:

providing a door frame defined by a top edge strip arrangement, a bottom edge strip arrangement, a first side edge strip arrangement and a second side edge strip arrangement attached to each other in a rectangular configuration, the door frame extending in a door frame plane (P1; P2);

connecting the door frame to a door guide rail configured to enable sliding the door frame along a vertical plane coinciding with the door frame plane (P1; P2); and after connecting the door frame to the door guide rail, mounting a first door panel in the door frame.

19. The method according to claim 18, further comprising:

prior to mounting said first door panel in the door frame, operating an adjustment arrangement to adjust the position of the door frame in relation to the door guide rail, and/or wherein mounting said first door panel in the door frame comprises inserting the at least one door panel into the door frame in an insertion direction (T) transversal to the door frame plane (P1; P2), and/or the method further comprising:

mounting a first divider strip to the door frame, the first divider strip dividing the door frame into a first subframe and a second subframe, the first subframe holding said first door panel; and mounting a second door panel in said second subframe.

20. A sliding closet door assembly comprising:

a first door panel defined by a top edge strip arrangement, a bottom edge strip arrangement, a first side edge strip arrangement and a second side edge strip arrangement attached to each other in a rectangular configuration; and a door frame assembly comprising at least a first side edge strip arrangement, a second side edge strip arrangement, a top edge strip arrangement and a bottom edge strip arrangement, the first side edge strip arrangement, second side edge strip arrangement, top edge strip arrangement, and bottom edge strip arrangement configured to define a door frame extending in a door frame plane, the door frame being adapted to receive and hold said first door panel to form a door guided along a guide rail, wherein the door frame is configured to receive said first door panel in a door panel insertion direction transversal to the door frame plane, and wherein at least one of said first side edge strip arrangement, second side edge strip arrangement, top edge strip arrangement, and bottom edge strip arrangement is configured as a fixed-groove strip arrangement comprising a fixed groove configured to receive a respective door panel edge in an edge insertion direction along the door frame plane.

* * * * *